US010142596B2

(12) United States Patent
Lam et al.

(10) Patent No.: US 10,142,596 B2
(45) Date of Patent: Nov. 27, 2018

(54) METHOD AND APPARATUS OF SECURED INTERACTIVE REMOTE MAINTENANCE ASSIST

(71) Applicant: The United States of America as represented by the Secretary of the Navy, Washington, DC (US)

(72) Inventors: Jack Lam, Rancho Cucamonga, CA (US); Philippe Navarro, Pasadena, CA (US); Bryan Stewart, Oxnard, CA (US); Michael Virbia, Oxnard, CA (US); Jacky Wong, Chino Hills, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 408 days.

(21) Appl. No.: 15/057,000

(22) Filed: Feb. 29, 2016

(65) Prior Publication Data
US 2016/0253563 A1 Sep. 1, 2016

Related U.S. Application Data

(60) Provisional application No. 62/126,024, filed on Feb. 27, 2015.

(51) Int. Cl.
*G06K 9/00* (2006.01)
*H04N 7/18* (2006.01)
(Continued)

(52) U.S. Cl.
CPC ......... *H04N 7/185* (2013.01); *G06F 11/0709* (2013.01); *G06F 11/0748* (2013.01);
(Continued)

(58) Field of Classification Search
CPC ............ G06F 11/0709; G06F 11/0793; G06F 11/0748; G06F 11/3664; H04N 7/185; H04N 9/3191; H04L 63/0428; H04L 63/08
See application file for complete search history.

(56) References Cited

U.S. PATENT DOCUMENTS 6,763,148 B1   7/2004 Sternberg et al.
7,641,342 B2   1/2010 Eberl et al.
(Continued)

FOREIGN PATENT DOCUMENTS

WO   WO 2009/036782   3/2009

OTHER PUBLICATIONS

Lipson, et al., Online Product Maintenance by Web-Based Augmented Reality; retrieved on 2001; 12 pages.
(Continued)

*Primary Examiner* — Obafemi O Sosanya
(74) *Attorney, Agent, or Firm* — Christopher A. Monsey

(57) ABSTRACT

A system and method for using the system comprising a head mounted device (HMD), a remote maintenance server (RMS), and a control section operable to identify the system under test (SUT) using an image recognition function, to identify a plurality of subsystems (PLoS) within the SUT in a data library, to create three dimensional models of the PLoS and displaying the same on a visual interface of the HMD using an augmented reality function, to connect to the RMS using an encryption algorithm via streaming video or images sent to the RMS, to collect SUT data and external (to the SUT) sensor data, to conduct a prognostics and/or health, maintenance, and/or management (HMM) service on the collected data to determine system health and projected health of the SUT and/or PLoS, to authenticate remote user
(Continued)

access to the RMS, to update the data library, and to insert a plurality of (HMM) designators on the visual interface.

7 Claims, 15 Drawing Sheets

(51) Int. Cl.
*H04L 29/06* (2006.01)
*G06F 11/07* (2006.01)
*G06Q 10/10* (2012.01)

(52) U.S. Cl.
CPC ......... *G06F 11/0793* (2013.01); *G06Q 10/10* (2013.01); *H04L 63/0428* (2013.01); *H04L 63/08* (2013.01)

(56) References Cited

U.S. PATENT DOCUMENTS

| | | | |
|---|---|---|---|
| 7,768,534 B2 | 8/2010 | Pentenrieder et al. | |
| 7,889,193 B2 | 2/2011 | Platonov et al. | |
| 7,969,383 B2 | 6/2011 | Eberl et al. | |
| 8,016,421 B2 | 9/2011 | Eberl et al. | |
| 8,042,947 B1 | 10/2011 | Eberl et al. | |
| 8,113,657 B2 | 2/2012 | Eberl et al. | |
| 8,125,405 B2 | 2/2012 | Dove et al. | |
| 8,254,699 B1 | 8/2012 | Zhao et al. | |
| 8,373,618 B2 | 2/2013 | Friedrich et al. | |
| 8,382,285 B2 | 2/2013 | Eberl et al. | |
| 8,443,186 B2 | 5/2013 | Kang | |
| 8,452,080 B2 | 5/2013 | Engedal | |
| 8,614,747 B2 | 12/2013 | Alt et al. | |
| 8,659,613 B2 | 2/2014 | Meier | |
| 8,675,965 B2 | 3/2014 | Lieberknecht et al. | |
| 8,686,923 B2 | 4/2014 | Eberl et al. | |
| 8,837,779 B2 | 9/2014 | Meier | |
| 9,043,076 B2 | 5/2015 | Bou-Ghannam et al. | |
| 9,088,787 B1 | 7/2015 | Smith et al. | |
| 9,154,695 B2 | 10/2015 | Boncyk et al. | |
| 2002/0010734 A1* | 1/2002 | Ebersole | H04L 29/06 709/201 |
| 2007/0273610 A1 | 11/2007 | Baillot | |
| 2013/0201215 A1 | 8/2013 | Martellaro et al. | |
| 2014/0035951 A1 | 2/2014 | Martellaro et al. | |
| 2014/0225814 A1 | 8/2014 | English et al. | |
| 2014/0254874 A1 | 9/2014 | Kurz et al. | |
| 2014/0293016 A1 | 10/2014 | Benhimane et al. | |
| 2014/0310595 A1 | 10/2014 | Acharya et al. | |
| 2015/0146007 A1* | 5/2015 | Dusik | G06K 9/00671 348/161 |
| 2015/0244903 A1* | 8/2015 | Adams | G02B 27/017 348/376 |
| 2015/0286515 A1* | 10/2015 | Monk | G06F 11/079 714/57 |
| 2015/0288868 A1 | 10/2015 | Slavin et al. | |

OTHER PUBLICATIONS

AMRA: Augmented Reality Assistance for Train Maintenance Tasks; Didier et al.; retrieved from https://hal.archives-ouvertes.fr/hal-00339457 on Sep. 17, 2009; 12 pages.

Hruska, Joel, Google Patents Real World Image Recognition Algorithm for Video, Photography, published Sep. 1, 2012, printed Sep. 29, 2015 from http://hothardware.com/News/Google-Patents-RealWorld-Image-Recognition-Algorithm-For-Video-Photography; 2 pages.

Bishop, Rollin, Google Granted Patent for Automatic Object Recognition in Videos, published Aug. 29, 2012, printed Sep. 29, 2015 from http://www.themarysue.com/google-object-recognition; 2 pages.

Lam et al., Enhanced Trajectory Based Similarity Prediction with Uncertainty Quantification, Annual Conference of the Prognostics and Health Management Society 2014; 12 pages.

* cited by examiner

METHOD AND APPARATUS OF SECURED INTERACTIVE REMOTE MAINTENANCE ASSIST

CROSS-REFERENCE TO RELATED APPLICATION

This patent application claims priority to U.S. Provisional Patent Application Ser. No. 62/126,024, filed Feb. 27, 2015, the disclosure of which is expressly incorporated herein by reference. This application is related to U.S. patent application Ser. No. 14/869,166, filed Sep. 29, 2015, entitled "SECURED MOBILE MAINTENANCE AND OPERATOR SYSTEM INCLUDING WEARABLE AUGMENTED REALITY INTERFACE, VOICE COMMAND INTERFACE, AND VISUAL RECOGNITION SYSTEMS AND RELATED METHODS", the disclosure of which is expressly incorporated herein by reference.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200,102) is assigned to the United States Government and is available for licensing for commercial purposes. Licensing and technical inquiries may be directed to the Office of Research and Technology Applications, Naval Surface Warfare Center Port Hueneme; telephone number: (805) 228-8485.

BACKGROUND AND SUMMARY OF THE DISCLOSURE

Current maintenance assistance technology between on-site personnel and technicians from remote locations or systems is generally difficult and time consuming in visually understanding the situation on site to determine the action needed to maintain a site systems' performance. Such maintenance assistance technology may be used, for example, in discussing vehicle issues with a road side assistance personnel or troubleshooting critical system at a power plant or oil platform in remote location.

On-site personnel are often incapable of performing maintenance based on complicated voice instruction from a remote technical expert. Also, known existing remote maintenance systems are not integrated into visualization technology to facilitate remote technical experts' ability to perform visual inspection, evaluate system performance parameter, and provide visual designator type direction back to on site personnel for troubleshooting and providing technical solutions. Existing remote maintenance systems are also not known to evaluate or address authorized versus unauthorized remote access intent to prevent outside users from intruding and/or disrupting performance of systems under test due to a lack of cybersecurity such as effective user authentication and limitations on encryption of data.

In one illustrative embodiment of the present disclosure, an operator with a wearable (e.g., a head mounted) visual user interface device and/or a device with a camera system can be positioned with respect to a system under test (SUT) with various embodiments of the invention to provide visual knowledge of the (SUT) back to a remote technical expert. The wearable or head mounted visual user interface device can also have an audio system which permits voice interaction with the wearable or head mounted visual user interface device for voice commands as well as interaction with remote experts or personnel.

Another illustrative embodiment includes a maintenance or telemetry section that collects system parameters such as environment (i.e. temperature, humidity, shock events/vibration/damage events from sensors (e.g. thermistor, humidity sensor, accelerometer, etc.) and system performance (i.e. speed, power, data transfer rates, etc.) and provides a data on such parameters and analysis of system health data based on such parameters as well as prognostics (e.g., remaining useful life estimation data analysis programming instructions tied to maintenance or system performance conditions to predict trend pattern on the condition and parameters), heuristic or expert system (e.g., if/then statement data analysis programming instructions tied to maintenance or system performance conditions to include ranges associated with such conditions and parameters) back to the remote technical expert. Image recognition and augmented reality technology can also be used to identify the system under test (SUT) and generate three-dimensional model of the system and associated subsystems with system parameters in combination with a visual user interface system.

Yet another illustrative embodiment allows a remote technical expert to access the maintenance system on site and insert one or more designators on the visual user interface presented to on-site maintenance, operator, or engineering personnel during troubleshooting or expert support activities such as flashing overlays, pointers, or other indicators.

Another illustrative embodiment incorporates a network topology to prevent remote users from accessing a system under test (SUT) through the maintenance system using, for example, separation of maintenance monitoring or telemetry systems from equipment operating or execution systems so that attacks on the maintenance or telemetry system do not impact functioning of equipment or non-maintenance systems. Embodiments of remote operation of on-site maintenance monitoring systems can be remotely operated with network design that prevents remote operation of non-maintenance systems. Authentication system and encryption methods and systems can also be included to provide cybersecurity functionality to use invention in an operational environment where data intrusion is expected.

Additional illustrative elements can include selective updating of remote maintenance by on-site systems to cut down on data traffic that can include transmissions during periods of low communications demand (e.g., 2 am local time when users are not placing demands on systems under test or communications networks used by such users or systems supporting such users), selective update of maintenance or telemetry data replication or mirroring databases at remote sites, maintenance activity based remote updates, and remote expert data requests that trigger updates or selective data transfers. Also, illustrative embodiments can also include data compression and video processing capability to reduce amount of bandwidth required to transmit both system performance parameters and video captured by the head mounted device.

An illustrative embodiment interactive remote maintenance assist system includes a head mounted device (HMD) having a visual interface, a voice interface system with voice recognition systems, a control section, an imager system operable to collect video or still images, and an input/output system. A remote maintenance server (RMS) is operable to communicate with the HMD. A control section includes a first section configured to identify the system under test (SUT) using an image recognition function, a second section configured to identify a plurality of subsystems (PLoS) within the SUT in a data library, a third section configured to create three dimensional models of the PLoS and displaying same on the visual interface of the HMD using an augmented reality function, a fourth section configured for connecting to the RMS using an encrypted connection wherein connecting is via streaming video or images sent to the RMS and connecting comprises collecting SUT data and external, to the SUT, sensor data, a fifth section configured for conducting a prognostics and/or health, maintenance, and/or management (PHM) service on the collected data to determine system health and projected health of the SUT and/or PLoS, and a sixth section configured to authenticate remote user access to the RMS, update the data library, and insert a plurality of PHM designators on the visual interface.

According to another illustrative embodiment of the present disclosure, a plurality of processing systems for an interactive remote maintenance assist system includes a first section having a first head-mounted device with a camera, a microphone, a transceiver and a power unit. A second section includes a computer processing system user input interface, a third section includes a user interface including a graphical user interface, and a fourth section includes a first storage section operable to store a plurality of data. A fifth section includes a processing system having a processing unit and a non-transitory machine instruction storage section operable to store a plurality of machine readable computer processing system instructions operable to control the processing unit and the first, second and third sections. A sixth section includes a first server system, wherein the first section is in position in a first orientation with respect to a system under test, the first section is positioned based on a first distance from a section from the system under test (SUT) based on a first field of vision determined based on a distance seen from a first camera in the first section to the system under test. The fourth section and the sixth section store a plurality of data comprising a first data identifying an authenticated user, a second data identifying configuration of a plurality of systems under test, a third data identifying configuration of a plurality of subsystems within the plurality of systems under test, a fourth data identifying a plurality of sensor parameters used to monitor the plurality of subsystems, a fifth data showing a plurality of three-dimensional models representing the plurality of subsystems, a sixth data showing a plurality of maintenance manuals reflecting the maintenance available for the plurality of subsystems, a seventh data showing a plurality of maintenance videos reflecting the maintenance available for the plurality of subsystems, an eighth data identifying a plurality of available operational modes of the system under test, a ninth data identifying a plurality of environment sensor types used to monitor the system under test, a tenth data identifying system health statuses and estimated health measures comprising remaining useful life, mean time to repair, mean time between maintenance for the plurality of subsystems and the system under test, an eleventh data identifying a plurality of videos captured by the camera in the first section, and a twelfth data identifying a plurality of images captured by the camera in the first section.

The plurality of machine readable computer processing system instructions in the fifth section may include a first plurality of machine readable computer processing instructions operable to identify a system under test (SUT) using the first section to capture a first image of the system under test (SUT) using the camera in the first section and use an image recognition function to match a pattern between the first image and a second image referenced in the first data from the fourth section. A second plurality of machine readable computer processing instructions in the fifth section may be operable to display a plurality of three-dimensional models from the first data in the fourth section by using an augmented reality function to display the second image of the system under test (SUT) and a third image of the plurality of subsystems under test wherein the system under test (SUT) is represented in the third section. A third plurality of machine readable computer processing instructions in the fifth section are operable to identify a system under test (SUT) using the first section to stream a first video of the system under test (SUT) using the camera in the first section. A fourth plurality of machine readable computer processing instructions in the fifth section may be operable to encode a first network message or a first video stream in the first section using a pseudo-random encryption key. A fifth plurality of machine readable computer processing instructions in the fifth section may be operable to communicate to the sixth section through a wired or wireless network communication method. A sixth plurality of machine readable computer processing instructions in the fifth section may be operable to display a first visual overlay with a plurality of designators to be displayed on the third section as information to be received from the sixth section. A seventh plurality of machine readable computer processing instructions of the fifth section may be operable to display a second visual overlay with a plurality of maintenance procedures, a plurality of maintenance videos, a plurality of sensor parameters on subsystems under test for the system under test (SUT) by issuing a plurality of machine readable computer processing instructions to the sixth section.

The sixth section is illustratively in a first network including a plurality of local nodes comprising the first section, a local switch node connected to the sixth section and connected to at least one of a plurality of switch nodes for a plurality of subsystems under test, a plurality of switch nodes for a plurality of external sensors, and a plurality of switch nodes for a plurality of remote locations. A data transfer mechanism from a local switch node in the first network to a plurality of switch nodes for a plurality of subsystems under test is deactivated. A data transfer mechanism from a local switch node in the first network to a plurality of switch nodes for a plurality of external sensors is deactivated.

The plurality of machine readable computer processing system instructions in the sixth section may include an eighth plurality of machine readable computer processing instructions operable to process a first video stream received from the first section into a plurality of video formats used for compression and transfer. A ninth plurality of machine readable computer processing instructions in the sixth section may be operable to collect and store a plurality of sensor parameters from a plurality subsystems under test in a system under test (SUT) or plurality of external sensors into a second storage section in the sixth section. A tenth plurality of machine readable computer processing instructions in the sixth section may be operable to authenticate user access from a plurality of remote locations. An eleventh plurality of machine readable computer processing instructions in the sixth section may be operable to provide prognostics and health management services to evaluate a plurality of sensor parameters stored in the second storage section for potential failure and suggested action by comprising a statistical recognizer or a machine learning recognizer including one of: a regression recognizer, a Hidden Markov Model (HMM) recognizer, a dynamic time warp (DTW) recognizer, a neural network, a fuzzy logic engine, a Bayesian network, an inference rule engine, and a trajectory similarity based prediction (TSBP). A twelfth plurality of machine readable computer processing instructions in the sixth section may be operable to compress data stored in the second storage section into a smaller data size format to provide bidirectional transfer to a plurality of remote locations. A thirteenth plurality of machine readable computer processing instructions in the sixth section may be operable to encode a second network message or a second video stream stored in the second storage section located in the sixth section using a pseudo-random encryption key. A fourteenth plurality of machine readable computer processing instructions in the sixth section may be operable to update data in the fourth section and the sixth section from a data library at a remote location.

According to another illustrative embodiment of the present disclosure, a non-transitory computer processing medium includes a plurality of machine readable processing instructions including a first plurality of machine readable computer processing instructions operable to identify a system under test (SUT) using a first section to capture a first image of the system under test (SUT) using a first camera in the first section and use of an image recognition function to match a pattern between the first image and a second image referenced in a first data from a fourth section, and a second plurality of machine readable computer processing instructions operable to display a plurality of three-dimensional models from the first data in the fourth section by using an augment reality function to display the second image of a system under test (SUT) and a third image of a plurality of subsystems under test wherein a system under test (SUT) is comprised of in the third section. A third plurality of machine readable computer processing instructions are operable to identify a system under test (SUT) using the first section to stream a first video of the system under test (SUT) using the first camera in the first section. A fourth plurality of machine readable computer processing instructions are operable to encode a first network message or a first video stream in the first section using a pseudo-random encryption key. A fifth plurality of machine readable computer processing instructions are operable to communicate to the sixth section through a wired or wireless network communication method. A sixth plurality of machine readable computer processing instructions operable to display a first visual overlay with a plurality of designators to be displayed on the third section as information to be received from the sixth section. A seventh plurality of machine readable computer processing instructions operable to display a second visual overlay with a plurality of maintenance procedures, a plurality of maintenance videos, a plurality of sensor parameters on subsystems under test for the system under test (SUT) by issuing a plurality of machine readable computer processing instructions to the sixth section. An eighth plurality of machine readable computer processing instructions are operable to process a first video stream received from the first section into a plurality of video formats used for compression and transfer. A ninth plurality of machine readable computer processing instructions operable to collect and store a plurality of sensor parameters from a plurality subsystems under test in a system under test (SUT) or plurality of external sensors into a second storage section in the sixth section. A tenth plurality of machine readable computer processing instructions operable to authenticate user access from a plurality of remote locations. An eleventh plurality of machine readable computer processing instructions operable to provide prognostics and health management services to evaluate a plurality of sensor parameters stored in the second storage section for potential failure and suggested action by comprising a statistical recognizer or a machine learning recognizer including one of: a regression recognizer, a Hidden Markov Model (HMM) recognizer, a dynamic time warp (DTW) recognizer, a neural network, a fuzzy logic engine, a Bayesian network, an inference rule engine, and a trajectory similarity based prediction (TSBP). A twelfth plurality of machine readable computer processing instructions operable to compress data stored in the second storage section into a smaller data size format to provide bidirectional transfer to a plurality of remote locations. A thirteenth plurality of machine readable computer processing instructions operable to encode a second network message or a second video stream stored in the second storage section located in the sixth section using a pseudo-random encryption key. A fourteenth plurality of machine readable computer processing instructions to update data in the fourth section and sixth section from a data library at a remote location.

According to a further illustrative embodiment of the present disclosure, an interactive remote maintenance assist system includes a system under test (SUT) including one or more system racks having a plurality of computing servers disposed therein, the computing servers being comprised of a plurality of circuit boards wherein at least one circuit board includes one or more sensors configured to provide data indicating one of temperature, fan speed, processor speed, memory capacity, and voltage power values, the data corresponding to performance parameters of at least one computing server. A first display device is positioned at a first location, the first display device including a first graphical user interface (GUI) configured to capture and display a visual graphic, the visual graphic depicting a model of the system under test. A second display device is positioned at a second location that is spaced apart from the first location, the second display device being communicably coupled to the first display device and including a second (GUI) configured to display the visual graphic depicting the model of the system under test (SUT) being displayed by the first display device. A maintenance server is communicably coupled to the first display device and the second display device, the maintenance server being disposed intermediate the first and second display devices and being configured to provide bi-directional data communication between the first and second display devices. The first and second displays each include object recognition logic such that the model of the system under test (SUT) depicted by the first and second GUIs each include digital relational structures corresponding to the computing servers and wherein the data provided by the sensors is viewable within the model and accessible by at least the second display device. The second display device further includes logic configured to perform one of regression and statistical analysis on the data provided by the sensors to enable a user at the second location to determine one of a current and prospective system fault associated with at least one computing server and wherein the maintenance server enables the user to transmit one or more instructions for resolving the current system fault and for mitigating the occurrence of the prospective system fault.

According to another illustrative embodiment of the present disclosure, a method of operating an interactive remote maintenance system includes providing a system under test (SUT) including one or more system racks having a plurality of computing servers disposed therein, the computing servers having a plurality of circuit boards including at least one sensor that provides data indicating one of temperature, fan speed, processor speed, memory capacity, and voltage power values, the data corresponding to performance parameters of at least one computing server, providing a first display device positioned at a first location, the first display device including a first graphical user interface (GUI), providing a second display device positioned at a second location that is spaced apart from the first location, the second display device being communicably coupled to the first display device and including a second (GUI), and providing a maintenance server communicably coupled to the first display device and the second display device, the maintenance server providing bi-directional data communication between the first and second display devices. The method further includes collecting, by the first display device, the data corresponding to performance parameters of the at least one computing server and transmitting the data to the second display device by way of the maintenance server. The method further includes identifying, by the first display device, one or more sensor data types corresponding to the cause of a current system failure and a prospective system failure, wherein identifying the one or more sensor data types includes utilizing principle component analysis logic. The method also includes creating, by one of the first display device and the maintenance server, a regression trend based on a linear regression method, wherein the regression trend includes a performance trend line indicating prospective performance of the system under test. The method further includes comparing, by one of the first display device and the maintenance server, the collected performance parameters to the performance trend line of the regression trend. The method also includes predicting, by one of the first display device and the maintenance server, prospective values of the at least one sensor, the prospective values including data indicating one of temperature, fan speed, processor speed, memory capacity, and voltage power values, the data corresponding to prospective performance parameters of the at least one computing server. The method further includes displaying, by the first and second display devices, a visual graphic depicting a model of the system under test, the model including digital relational structures corresponding to the computing servers and wherein the data provided by the sensors is viewable within the model and accessible by at least the second display device. The method also includes determining, by one of the first display device and the maintenance server, a root-cause for one of the current system failure and the prospective system failure associated with the at least one computing server and wherein the maintenance server enables a user at the second location to transmit, to the first display device, instructions for resolving the current system failure and for mitigating the occurrence of the prospective system failure, the instructions being displayed by way of the first GUI.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
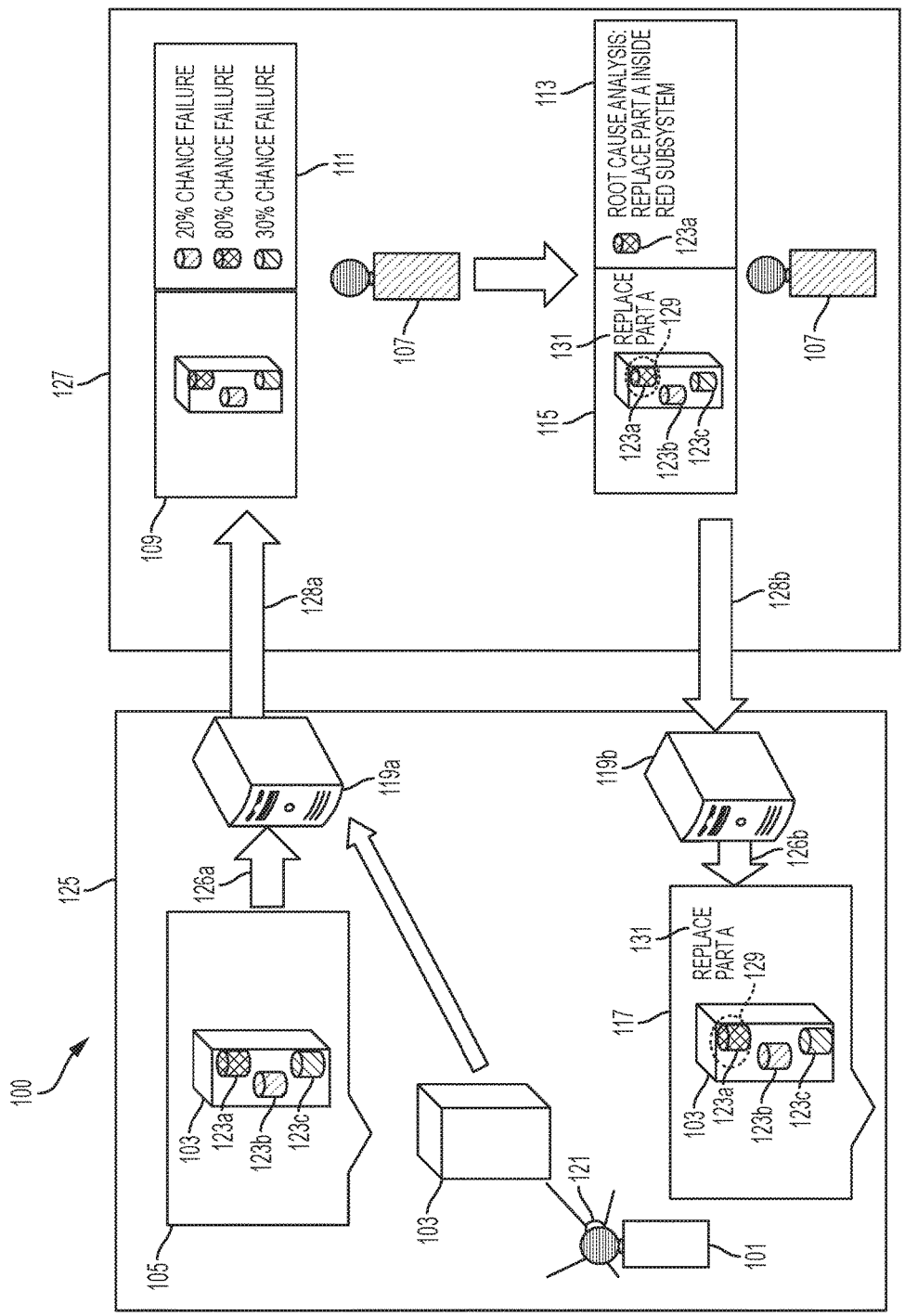
FIG. 1 is a diagrammatic view showing an exemplary maintenance assistance system including an operational environment and a remote environment in accordance with an illustrative embodiment of the present disclosure.

FIG. 1 is a diagrammatic view of an exemplary interactive remote maintenance assist system 100, including an exemplary operational or base environment 125 in communication with a remote environment 127 in accordance with an illustrative embodiment of the present disclosure. A human, illustratively an on-site technician 101 is shown in an exemplary operational position at the operational environment 125 relative to a system under surveillance or system under test (SUT) 103. The operational environment 125 illustratively includes a head mounted device (HMD) 121 attached to the technician 101 in an exemplary position to capture a visual graphic of the system under test (SUT) 103. Remote maintenance servers (RMS) 119a and 119b are configured to receive data from the head mounted device (HMD) 121 through routers 126a and 126b, respectively.

While separate servers 119a and 119b and routers 126a and 126b are shown in FIG. 1, it should be noted that a single server 119 and a single router 126 may be provided. Additionally, the server(s) 119 may be of conventional design as including a processor (e.g., a central processing unit or cpu) in communication with a memory, such as non-transitory computer processing medium including a plurality of machine readable processing instructions executed by the various modules or components further detailed herein.

Figure 1A:
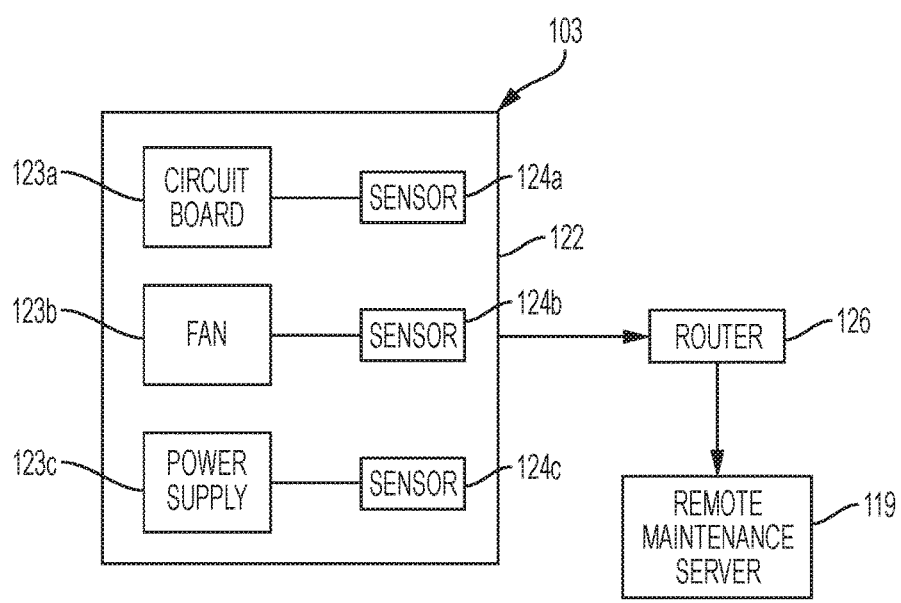
FIG. 1A is a diagrammatic view of an exemplary system under test (SUT) in the illustrative maintenance assistance system of FIG. 1.

With reference to FIGS. 1 and 1A, the system under test (SUT) 103 may include a plurality of subsystems (PLoS) 123a, 123b, 123c. In one illustrative embodiment, the system under test (SUT) 103 may comprise a server, and the subsystems (PLoS) 123a, 123b, 123c may comprise a circuit board, a fan, and a power supply, respectively, received within a chassis or cabinet 122. Sensors 124a, 124b, 124c are operably coupled with the subsystems (PLoS) 123a, 123b, 123c, respectively, to detect or measure parameters associated therewith.

FIG. 1A illustrates exemplary system under test (SUT) 103 as a server in an exemplary network configuration to provide data from sensors 124a, 124b, 124c to a remote maintenance server 119 in accordance with an illustrative embodiment of the disclosure. As noted above, the exemplary server representing a system under test (SUT) 103, may include circuit board 123a, fan 123b, and power supply 123c. Each of these components 123a, 123b, 123c may include built-in sensors 124a, 124b, 124c to monitor parameters, for example temperature and power voltage values. These parameters are illustratively received through the remote maintenance server 119 using a known simple network management protocol (SNMP) when the server 119 sends out a request to extract data from the sensors 124a, 124b, 124c. Other external sensors could be used in connection with the components 123, such as humidity sensors, vibration sensors, etc. to detect and/or measure parameters that could impact the health, reliability and/or longevity of the components 123. In one illustrative embodiment, a microphone (which could be part of the HMD 121) may be used as a sensor 124 to detect vibration and classifying its characteristics to determine whether there may be a maintenance issue.

The server 103 may include a conventional management information base (MIB) detailing, as network data, the sensor configuration and parameter values currently residing on the circuit board 123a, on the fan 123b, and on the power supply 123c. The server 103 is shown to transfer MIB data from the sensors 124a, 124b, 124c to an exemplary router 126a, and the router 126a will route the data to remote maintenance server 119a upon request, using the simple network management protocol (SNMP). This same arrangement may be used to monitor network traffic/computation capability and look at central processing unit (cpu) speed and memory capability to registrar an abnormal network pattern and abnormal server behavior that may require a server reboot and/or network routing update.

In an alternative illustrative embodiment, the system under test (SUT) 103 may use other network management protocols besides SNMP to transmit sensor data to the remote maintenance server 119. In another illustrative embodiment, the router 126a, as network data, also comprises of a plurality of MIB data (not shown) regarding the network traffic information and the MIB data is sent to the remote maintenance server 119 upon request.

The head mounted device (HMD) 121 illustratively includes a transparent shield or visor 130 configured to display a HMD graphical user interface (GUI) 105 of one of a plurality of systems under test (SUT) 103, with representations of the plurality of subsystems under test (PLoS) 123a, 123b, 123b generated by an augmented reality system. As further detailed herein, subsystem parameters are illustratively detected by the sensors 124a, 124b, 124c.

With further reference to FIG. 1, an incoming message 128a is shown transmitting information regarding HMD GUI 105 and system under test (SUT) 103 from the remote maintenance server 119a at the operational environment 125 to a HMD GUI 109 at the remote environment 127. An outgoing message 128b is shown to pass information regarding the exemplary designator 129, exemplary text 131 and other information from the second remote location GUI 113 from the remote environment 127 back to the remote maintenance server 119b at the operational environment 125.

The HMD GUI 105 and one of a plurality of systems under test (SUT) 103 is shown to the send a visual graphic of the HMD GUI 105 from the operational environment 125 to a representation of HMD GUI 109 pertaining the same visual graphic as the HMD GUI 105 through a remote maintenance server 119 in an exemplary operational position at the exemplary operational environment 125 to an exemplary remote environment 127. The system under test (SUT) 103 is also shown to send information regarding the plurality of subsystems (PLoS) 123a, 123b, 123c to the remote location GUI 111 through the remote maintenance server 119. A human, illustratively a remote technician 107 is shown in an exemplary position at remote environment 127 to review the representation of HMD GUI 109 and the remote location GUI 111.

A second remote location GUI 113 is generated at the remote environment 127 to identify the subsystem under test (SUT) 123 for maintenance action. A modified representation of HMD GUI 115 is generated at a remote environment 127 to include at least one designator 129 and exemplary text 131 to be transmitted to the remote maintenance server 119 at the operational environment 125.

A modified HMD GUI 117 is shown to the on-site technician 101 with the head mounted device 121 with information pertaining the at least one designator 129 on the subsystems under test (PLoS) 123a, 123b, 123c, and the text 131 to assist with maintenance.

An alternative illustrative embodiment can also allow the exemplary environment 125 at the exemplary remote environment 127 to be located inside a mobile location, such as a vehicle or a vessel. Another alternative embodiment allows the human 101 to use a hand-held mobile device, a tablet device, or a laptop device to capture a visual graphic of the plurality of system under test (SUT) 103 and display on a GUI in place of the HMD GUI 105. Yet another alternative embodiment allows the remote maintenance server 119 to transmit information to a plurality of exemplary remote environments 127. Another alternative embodiment allows the remote server 119 to communicate physically through a wire or wirelessly through free space. Yet another alternative embodiment allows the use of a microphone on the head mounted device 121 to communicate with the human 107 to discuss information on the system under test (SUT) 103. Another alternative illustrative embodiment allows video to be distributed from the remote maintenance server 119 to the remote location 127 using either a real time video streaming or a captured video.

The HMD 121 could be glasses, a helmet, or a camera that can be strapped on existing glasses and helmet. The GUI 105 could be projected on the visor 130 of the HMD 121, or it could be transmitted and projected on a tablet, mobile device, or a wearable device such as a smart watch. The GUI 151 illustratively adjusts the screen size accordingly to the device on which it is projecting. Another alternative includes a projector subsystem on the HMD 121 so it can project the 3-D images of the subsystems and its parameters onto the surface of the system under test (SUT) 103.

Figure 2:
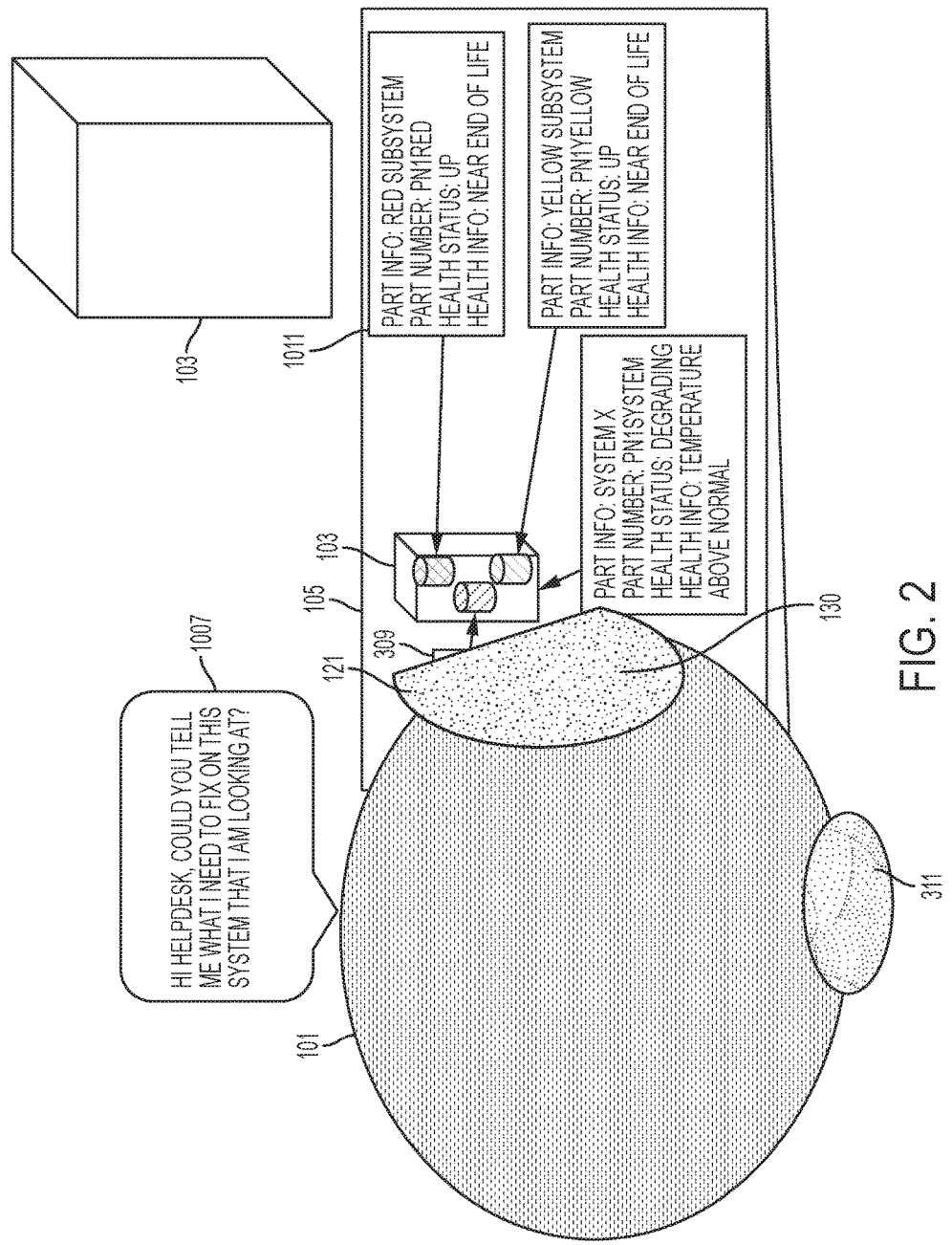
FIG. 2 is a diagrammatic view of a user with an exemplary head mounted device (HMD) positioned in the illustrative operational environment of FIG. 1.

FIG. 2 illustrates an exemplary HMD 121 in an exemplary position in an exemplary operational environment 125 in accordance with an illustrative embodiment of the disclosure. The technician 101 is shown to wear the HMD 121 in an exemplary position facing a system under test (SUT) 103. The HMD 121 is shown to project a HMD GUI 105 displaying the system under test (SUT) 103 using a HMD camera 1006. The HMD GUI 105 is shown to display an overlay 1011 to include additional information. The technician 101 is shown to communicate with a remote support person 107 using a voice input 1007, illustratively through a microphone 311.

Figure 3:
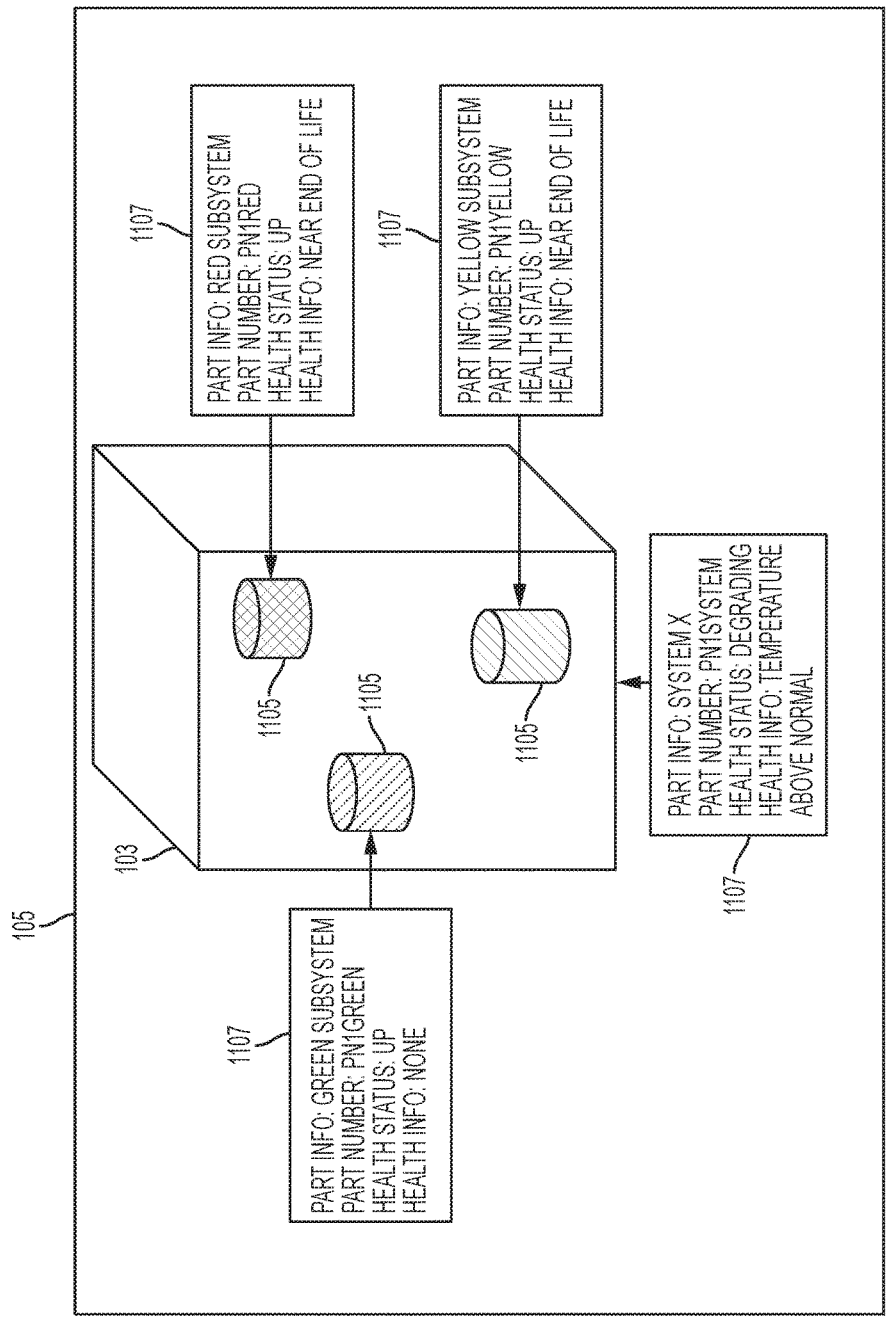
FIG. 3 is a diagrammatic view of an exemplary head mounted device graphical user interface receiving visual information from a head mounted device camera of the illustrative head mounted device (HMD) of FIG. 2.

FIG. 3 illustrates an exemplary HMD GUI 105 receiving visual information from the HMD camera 1006 according to an illustrative embodiment of the disclosure. A HMD GUI 105 is shown to display a system under test (SUT) 103. The HMD GUI 105 is also shown to display a plurality of three-dimensional models 1105*a*, 1105*b*, 1105*c* representing plurality of subsystems (PLoS) 123*a*, 123*b*, 123*c* inside the system under test (SUT) 103. A plurality of exemplary display boxes 1107 are shown to identify the plurality of three-dimensional model 1105 with information pertaining to the configuration and health status of the subsystems (PLoS) 123*a*, 123*b*, 123*c*.

All of the 3D models illustratively have attributes that represent the physical size and shape of the subsystems (PLoS) 123*a*, 123*b*, 123*c*, and will also link to each specific component/subsystem in a relational database structure (each image file shall be associated with one specific component). Each subsystem 123, in turn, will have association to its system 103 and its relative location/orientation within the system 103. When the user looks at the system through the HMD 121, the HMD 121 will first use its augmented reality software object recognition function to identify the system and its orientation to the HMD 121. The association between the system 103 and the subsystem 123 will then allow the HMD augmented reality to identify the subsystem 123 in its relative orientation to the HMD 121. Once the subsystem 123 is identified and selected, the subsystem's property such as its 3D image and its parameters (e.g., part number, temperature, voltage, etc.) can be retrieved from the server/memory and be projected on the HMD GUI 105.

Figure 4:
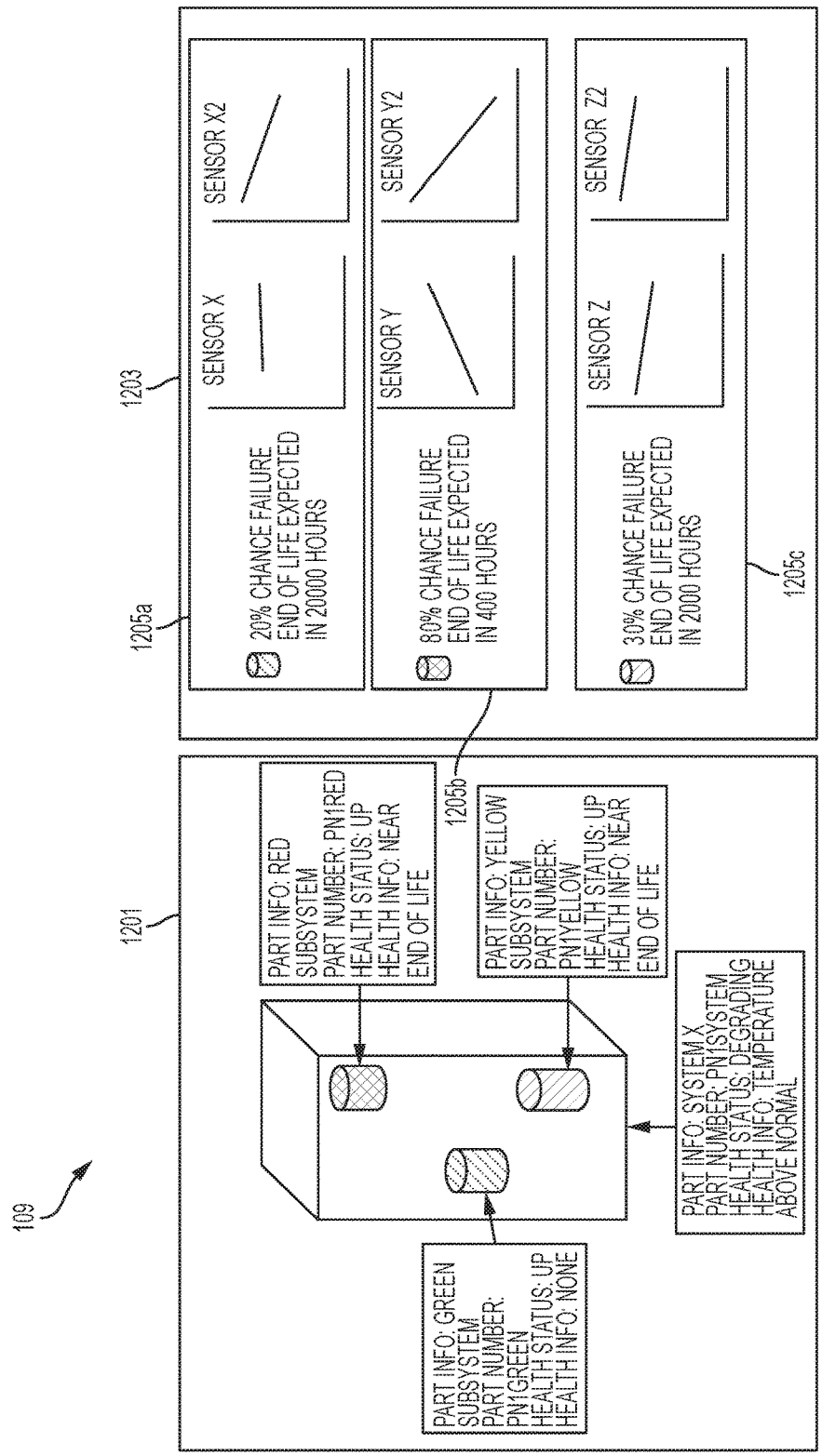
FIG. 4 is a diagrammatic view of an exemplary display in the remote environment of FIG. 1, receiving information from a remote maintenance server in accordance with an illustrative embodiment of the present disclosure.

FIG. 4 illustrates an exemplary display 109 from an exemplary remote environment 127 receiving information from remote maintenance server 119 according to an illustrative embodiment of the disclosure. A first remote location GUI 1201 is shown to represent the visual information as the HMD GUI 105. A second remote location GUI 1203 is shown to display a plurality of system health status 1205*a*, 1205*b*, 1205*c* on the plurality of subsystems 123*a*, 123*b*, 123*c* pertaining to sensor reading and estimate on the end of life for each subsystem 123*a*, 123*b*, 123*c*.

In one illustrative embodiment, the first remote location GUI 1201 and the second remote location GUI 1203 may be in separate displays. An alternative illustrative embodiment allows the first remote location GUI 1201 and the second remote location GUI 1203 to reside in the same display monitor.

Figure 5:
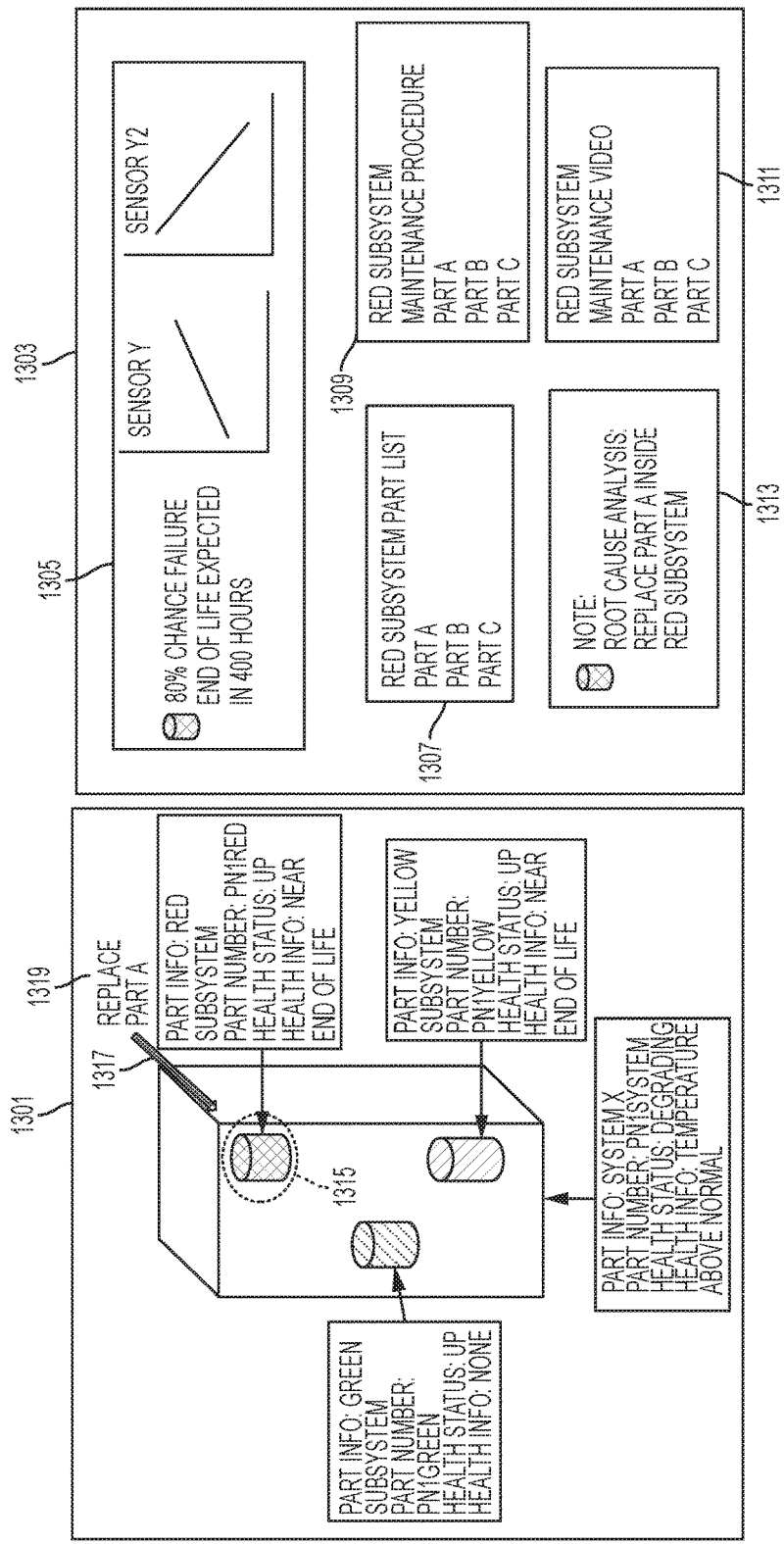
FIG. 5 is a diagrammatic view of an exemplary display in the remote environment of FIG. 1, sending information to a remote maintenance server in accordance with an illustrative embodiment of the present disclosure.

FIG. 5 illustrates an exemplary display 113, 115 from exemplary remote environment 127 sending information to remote maintenance server 119 according to an illustrative embodiment of the disclosure. A first remote location GUI 1301 is shown to display the visual information from the HMD GUI 1201 (FIG. 4). The first remote location GUI 1301 is also shown to include an exemplary free-form designator 1315, an exemplary custom designator 1317, and an exemplary text field 1319 added by operator 107 from remote environment 127 to illustrate an area of interest and instruction for maintenance. A second remote location GUI 1303 is shown to display a plurality of system health status 1305, a plurality of part lists 1307, a plurality of maintenance procedures 1309, a plurality of maintenance videos 1311, and a plurality of free-form notes 1313 for examination and determination of the appropriate maintenance strategy.

The free-form designator 1315, the exemplary custom designator 1317, and the exemplary text field 1319 can be generated using commercial software or mobile applications that provide screen sharing (i.e., Webex) and collaborating (i.e., SharePoint) functionality. The screen sharing functionality will allow HMD 121 to share its GUI display 105 with another user (usually at a remote location). The collaborating function will allow users to exchange designators on the screen or exchange file/image through a common SharePoint like environment.

The system health status display 1305 illustratively shows both the sensor values and prognostics and health management (PHM), illustratively through regression analysis resulting from a statistical analysis enabled software or programming language, such as Matlab or R programming language. The part list 1307, the maintenance procedure 1309, and the maintenance videos 1311 are media (e.g., documents, images and/or videos) that could be stored in a collaboration software suite (e.g., such as SharePoint). The free-form notes 1313 could be generated via software similar to Notepad, which is included in most collaboration software suites. Additionally, as an alternative embodiment, the remote system could contain a machine learning algorithm for clustering to identify the predicted cause of the failure and an expert system algorithm (i.e. decision tree) to determine the type of maintenance strategy (replace, recalibrate, shut off, etc.) to prevent the failure from occurring.

Illustrative prognostics and health management (PHM) analysis is further detailed below in connection with FIGS. 13-15. More particularly, an illustrative statistical recognizer (e.g., a regression analysis) is described in connection with FIG. 14, and an illustrative machine learning recognizer or analysis is described in connection with FIG. 15.

An alternative embodiment allows the operator 107 from the remote environment 127 to transfer information pertaining to the detailed information 1305, the part list 1307, the maintenance procedure 1309, the maintenance video 1311, and the free-form note 1313 from the second remote location GUI 1303 to the remote maintenance server 119 to allow the HMD GUI 117 to view the content.

Figure 6:
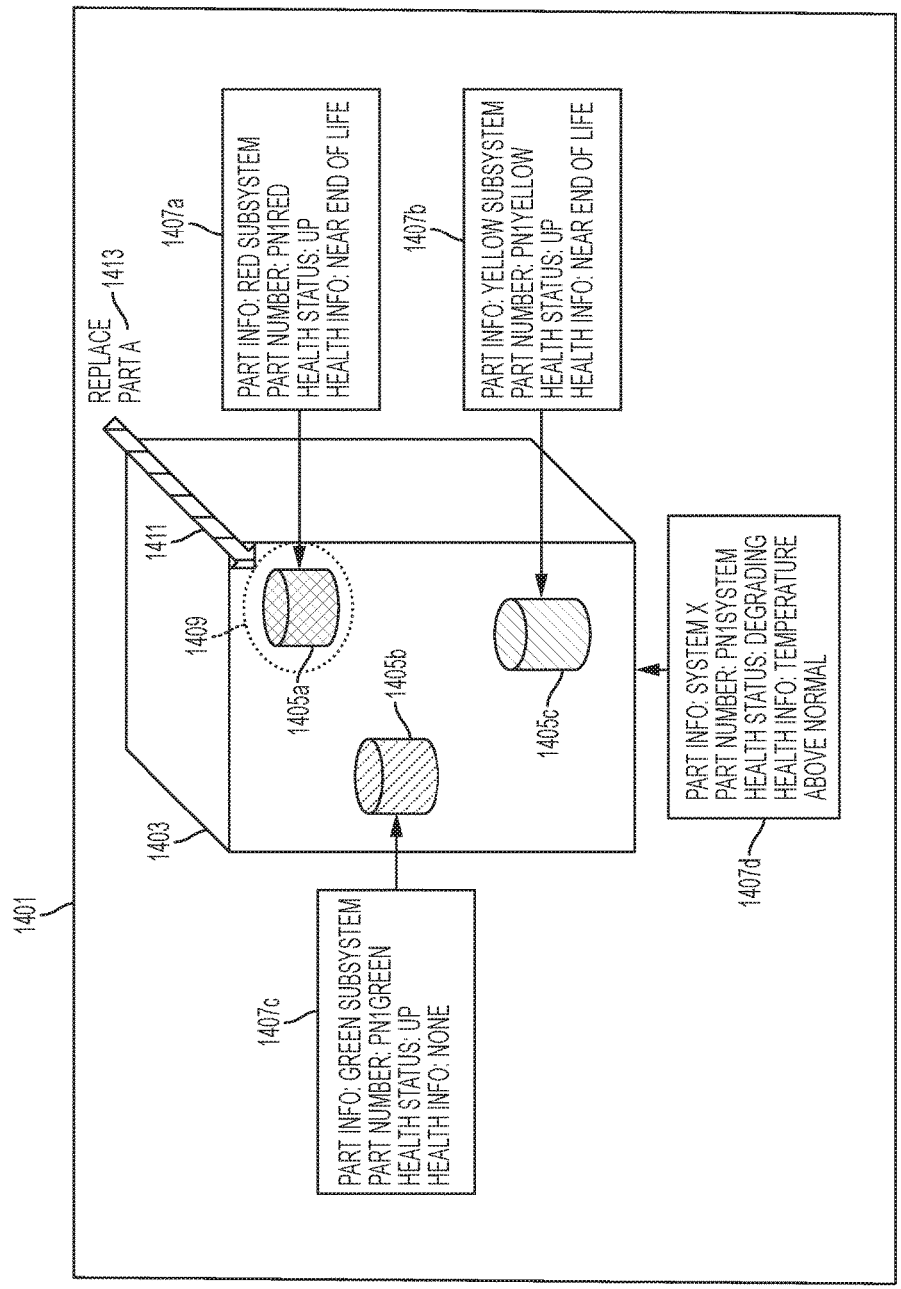
FIG. 6 is a diagrammatic view of an exemplary head mounted device graphical user interface after receiving information from the remote environment of FIG. 1 in accordance with an illustrative embodiment of the present disclosure.

FIG. 6 illustrates an exemplary HMD GUI 117 after receiving information from an exemplary remote environment 127 according to an illustrative embodiment of the disclosure. A HMD GUI 1401 is shown to display a system under test (SUT) 1403. The HMD GUI 1401 is also shown to display a plurality of three-dimensional models 1405a, 1405b, 1405c representing a plurality of subsystems 123a, 123b, 123c inside the system under test (SUT) 103. A plurality of exemplary display boxes 1407a, 1407b, 1407c are shown to identify the plurality of three-dimensional models 1405a, 1405b, 1405c with information pertaining to the subsystems' configuration and health status. The HMD GUI 1401 is also shown to include an exemplary free-form designator 1409, an exemplary custom designator 1411, and an exemplary text field 1413 received through a remote maintenance server 119 from operator 107 from remote environment 127 to illustrate an area of interest and instruction for maintenance.

Similar to the first remote location GUI 1301, the HMD GUI 1401 may use similar conventional software or mobile applications. For example, the free-form designator 1409, the exemplary custom designator 1411, and the exemplary text field 1413 can be generated using commercial software or mobile applications that provide screen sharing (i.e., Webex) and collaborating (i.e., SharePoint) functionality. The screen sharing functionality will allow HMD 121 to share its GUI display 105 with another user (usually at a remote location). The collaborating function will allow users to exchange designators on the screen or exchange file/image through a common SharePoint like environment.

Alternative illustrative embodiment allows the free-form designator 1409, the custom designator 1411, and the text field 1413 to be a hypertext link and allow the HMD GUI 1401 to open up a plurality of system health status, a plurality of maintenance procedure, and a plurality of maintenance video to assist maintenance. The free-form designator 1409, the exemplary custom designator 1411, and the exemplary text field 1413 can be generated using commercial software or mobile applications that provide screen sharing (i.e., Webex) and collaborating (i.e., SharePoint) functionality. The hypertext link will link to the collaboration portal (i.e. SharePoint) where the documents and videos are illustratively stored and shared between the users. The HMD should have the drivers or codecs to display the document (i.e. Adobe Reader) or video (i.e. any video player like QuickTime).

Figure 7:
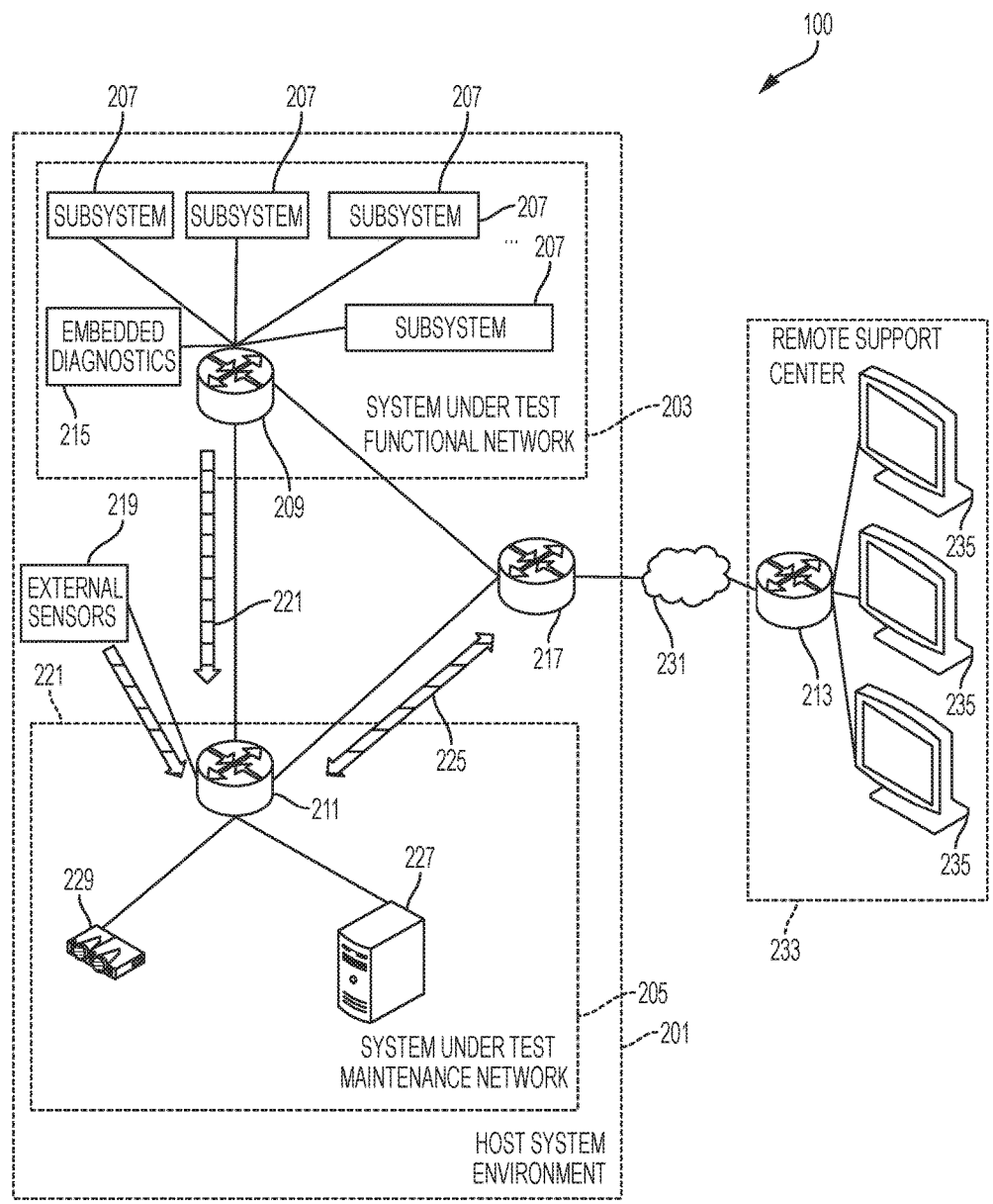
FIG. 7 is a diagrammatic view showing an exemplary maintenance assistance system in a network topology relative to a system under test (SUT) and a remote environment in accordance with an illustrative embodiment of the present disclosure.

FIG. 7 illustrates an exemplary maintenance assistance system 100 in an exemplary network topology relative to an exemplary system under test (SUT) 103 and an exemplary remote environment 127 in accordance with an illustrative embodiment of the disclosure. A plurality of system under test functional network 203 and a plurality of system under test maintenance network 205 are shown in an exemplary network topology relative to a host system environment 201. The system under test functional network 203 is shown to connect a plurality of subsystem 207 and a plurality of embedded diagnostics system 215 through a plurality of functional network device 209. The system under test maintenance network 205 is shown to connect a plurality of remote maintenance servers 227 and a plurality of HMDs 229 through a plurality of maintenance network devices 211. The plurality of functional network devices 209 and a plurality of external sensors 219 are shown to provide unidirectional network connectivity 221 to the plurality of maintenance network devices 211. The plurality of functional network devices 209 and the plurality of maintenance network devices 211 are shown to connect a plurality of external network devices 217. The plurality of network devices 211 are also shown to provide bidirectional network connectivity 225 with the plurality of external network devices 217.

The plurality of external network devices 217 in a host system environment 201 are shown to connect to a plurality of remote location network devices 213 in a remote environment 233 through a remote network 231. The plurality of remote location network devices 213 are shown to connect a plurality of computing device 235 in the remote environment 233. The functional network device 209, the maintenance network device 211, and the external network device 217 could be a single network device with a firewall and routing capability to maintain separate network domains. The external network device 217 can also be a secured network domain, which contains a series of network devices, to provide anti-virus, port forwarding, and proxy service functions to prevent unknown internet protocol (ip) address or malware to enter the host system.

An alternative illustrative embodiment can also allow the plurality of functional network devices 209 to not connect to the plurality of external network devices 217 to allow remote connectivity only between the plurality of maintenance network devices 211 in the system under test maintenance network 205 and the plurality of external network devices 217.

Figure 8:
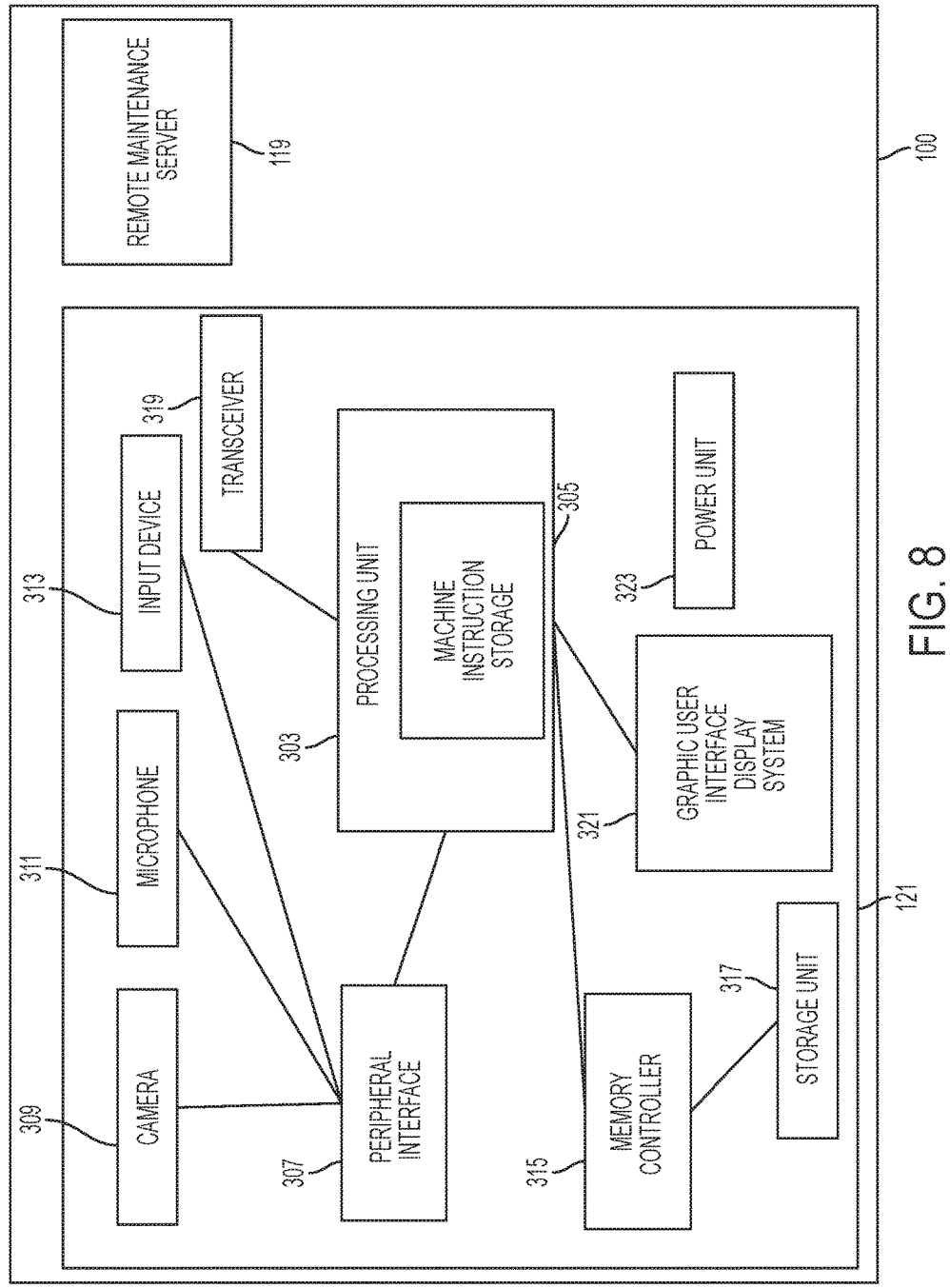
FIG. 8 is an exemplary functional block diagram of a remote environment of an illustrative embodiment of the present disclosure.

FIG. 8 is a functional block diagram of an illustrative embodiment of the system 100. The remote maintenance assistance system 100 can be comprised of a HMD 121 and a remote maintenance server 119. The HMD 121 can be comprised of a camera 309, a microphone 311, an input device 313, a transceiver 319, and a power unit 323, a peripheral interface 307, a processing unit 303, a memory controller 315, a storage unit 317, and a graphical user interface display system 321. The peripheral interface 307 in the HMD 121 can be connected to the camera 309, the microphone 311, the processing unit 303, and the input device 313. The processing unit 406 on the head mounted device 121 can be connected to a memory controller 315, the peripheral interface 307, the transceiver 319, and the graphical user interface display system 321. The memory controller 315 is connected to the storage unit 317 inside the HMD 301.

Figure 9:
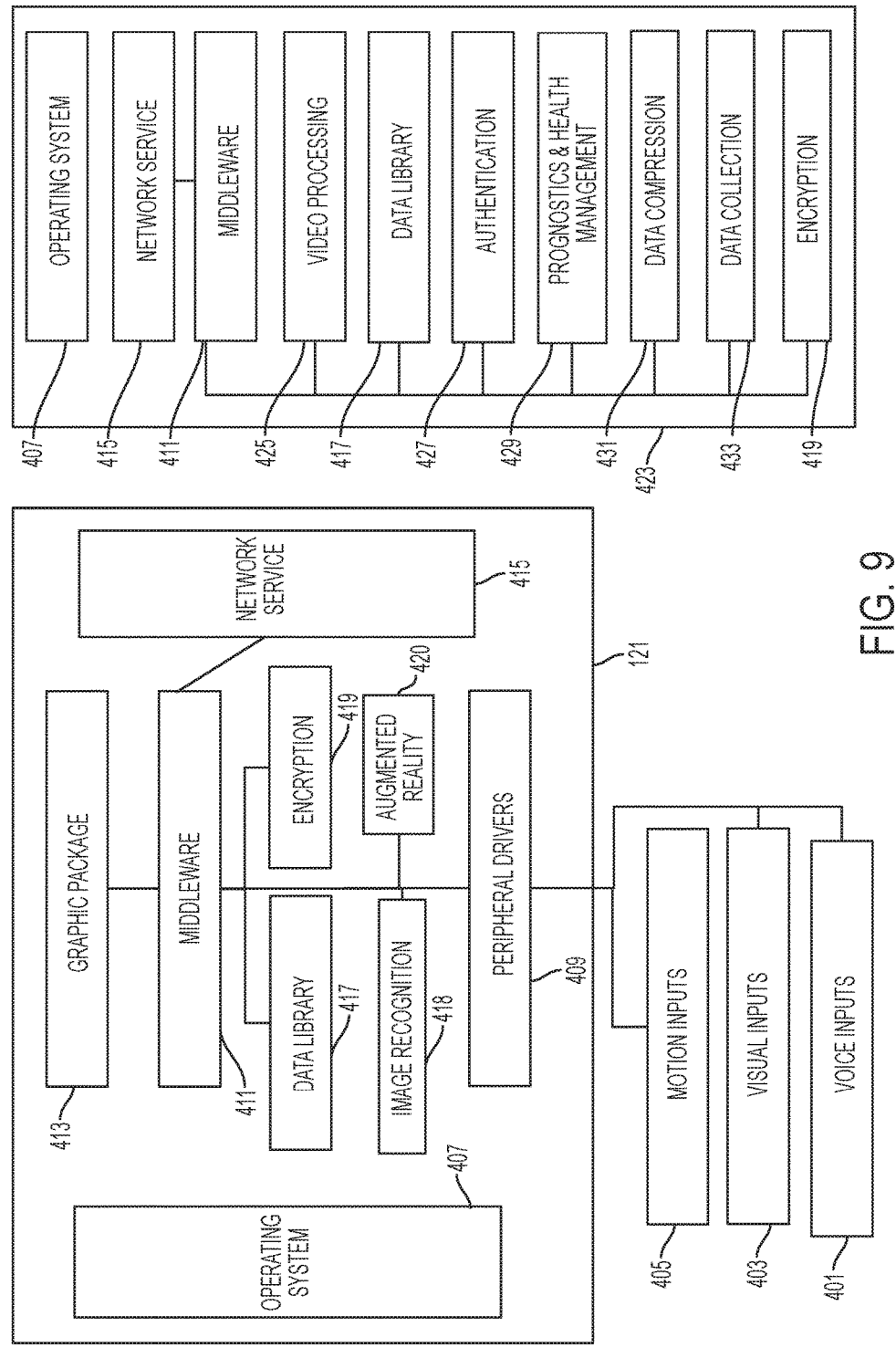
FIG. 9 is an exemplary block diagram of a plurality of software applications of the processor of the illustrative maintenance assistance system of FIG. 1.

FIG. 9 illustrates a plurality of software applications of the processing section of an illustrative embodiment of the system 100. The HMD 121 illustratively comprises, as software, of an operating system 407, a plurality of peripheral drivers 409, a middleware 411, a data library 417, an authentication and encryption service 419, a network service 415, an image recognition service 418, an augmented reality service 420, and a graphic package software 413. The plurality of peripheral drivers 409 on the HMD 121 receives and interprets a plurality of motion inputs 405, a plurality of visual inputs 403, and a plurality of voice input 401. A remote maintenance server 423 comprises, as software, of an operating system 407, a network service 415, a middleware 411, and a video processing service 425, a data library 417, an user authentication service 427, a prognostics & health management service 429, a data compression service 431, and an encryption service 433. The network service 415 on the remote maintenance server 423 is shown to communicate with a network service on the HMD 421 and a plurality of network services (not shown).

Illustratively, all of the software and drivers of FIG. 9 are commercially available. The voice input 401, the visual inputs 403 and the motion inputs 405 are illustratively analog sources of inputs that can be used to navigate the GUI. The peripheral drivers 409 illustratively include the drivers necessary to translate these analog inputs 401, 403, 405 into digital instruction so the operating system 407 can understand. The operating system 407 is the OS, such as Android OS for HMD and Windows server OS/Linux OS, for remote server 119. The middleware 411 are the interface standards that describe how the OS instruction is being translated and sent between each software program.

The graphic package software 413 is a typical GUI application that is available as part of the OS and displayed on the HMD screen. The network service 415 is the network management module in the OS that allow user to manage wife and other network exchange service on the HMD and the server. The data library 417 consists of a database, like structured query language (SQL), to store relational data (i.e. parameter value) as well as the file storage service, like a FTP service, to store documents and images.

The authentication and encryption service 419 illustratively includes an encryption function within the OS to convert data into the advanced encryption standard (AES) 128 (also known as Rijndael) or a similar encryption standard. An encryption key is illustratively be stored in the database and exchanged when a validated remote server is requesting the access of specific data. AES 128 is common to conventional operating systems and generally converts a data message into a 128-bit code that can only be read through the encryption key. The encrypted message will be sent to receiving end along with the key so that only the receiving end can read the data inside the message. Various embodiments of an authentication and encryption service can be used such as, for example, as disclosed in U.S. Pat. No. 8,443,186, Method and Device of Data Encryption, the disclosure of which is incorporated herein by reference.

The image recognition service 418 and the augmented reality service 420 are usually packaged as a single commercial software (such as Metaio). The video processing service 425 could be any video processing driver on the GPU/video card that will handle real-time video streaming, recording of video captured by HMD or opening maintenance video. The user authentication service 427 is a user authentication function typically in the OS to request username/password for administrative action.

Other illustrative embodiments of an image recognition service can include systems such as, for example, U.S. Pat. No. 6,763,148, Image Recognition Methods, and U.S. Pat. No. 8,254,699, Automatic Large Scale Video Object Recognition, the disclosures of which are incorporated herein by reference.

Various alternative embodiments of augmented reality service 420 can include a variety of augmented reality systems, such as disclosed in, for example, U.S. Patent Application Publication No. 2015/0146007, Maintenance Assistance System, U.S. Patent Publication No. 2014/0225814, Method And System For Representing And Interacting With Geo-Located Markers, U.S. Patent Publication No. 2014/0035951, Visually Passing Data Through Video, or U.S. Patent Publication No. 2013/0201215, Accessing Applications in a Mobile Augmented Reality Environment, U.S. Patent Publication No. 2014/0293016, Method for Estimating a Camera Motion and for Determining a Three-Dimensional Model of a Real Environment, U.S. Patent Application Publication No. 2014/0254874, Method of Detecting and Describing Features from an Intensity Image, U.S. Patent Application Publication No. 2007/0273610, System and Method to Display Maintenance and Operational Instructions of an Apparatus using Augmented Reality, U.S. Pat. No. 8,837,779, Method for Determining the Pose of a Camera and for Recognizing an Object of a Real Environment, U.S. Pat. No. 8,686,923, Interactive Data View and Command System, U.S. Pat. No. 8,675,965, Method and System for Analyzing an Image Generated by at least One Camera, U.S. Pat. No. 8,659,613, Method and System for Displaying an Image Generated by at least One Camera, U.S. Pat. No. 8,614,747, Composite Image Generating System, Overlaying Condition Determining Method, Image Processing Apparatus, and Image Processing Program, U.S. Pat. No. 8,452,080, Camera Pose Estimation Apparatus and Method for Augmented Reality Imaging, U.S. Pat. No. 8,382,285, Device and Method for Determining the Orientation of an Eye, U.S. Pat. No. 8,113,657, Device and Method for Determining the Orientation of an Eye, U.S. Pat. No. 8,042,947, Information System, U.S. Pat. No. 8,016,421, Information System and Method for Providing Information Using a Holographic Element, U.S. Pat. No. 7,969,383, Interactive Data View and Command System, U.S. Pat. No. 7,889,193, Method of and System for Determining a Data Model Designed for being Superposed with an Image of a Real Object in an Object Tracking Process, U.S. Pat. No. 7,768,534, Method of and System for Determining Inaccuracy Information in an Augmented Reality System, and U.S. Pat. No. 7,641,342, Information System and Method for Providing Information Using a Holographic Element, the disclosures of which are incorporated herein by reference.

The health management service 429 can be any commercial prognostics and health management (PHM) software that can provide statistical recognizers (e.g., algorithms) or machine learning recognizers (e.g., algorithms) on the subsystem's parameter data to identify when the subsystem will fail, what cause the failure (via failure mode), and how the failure will impact the overall system. Additional details on illustrative PHM software are provided in connection with FIGS. 13-15.

The data compression service 431 is any data compression program to package data into smaller size to transfer more data in real time. The data collection 433 illustrates that the server collects sensor information from the system and subsystems via SNMP and other data collection means.

Figure 10:
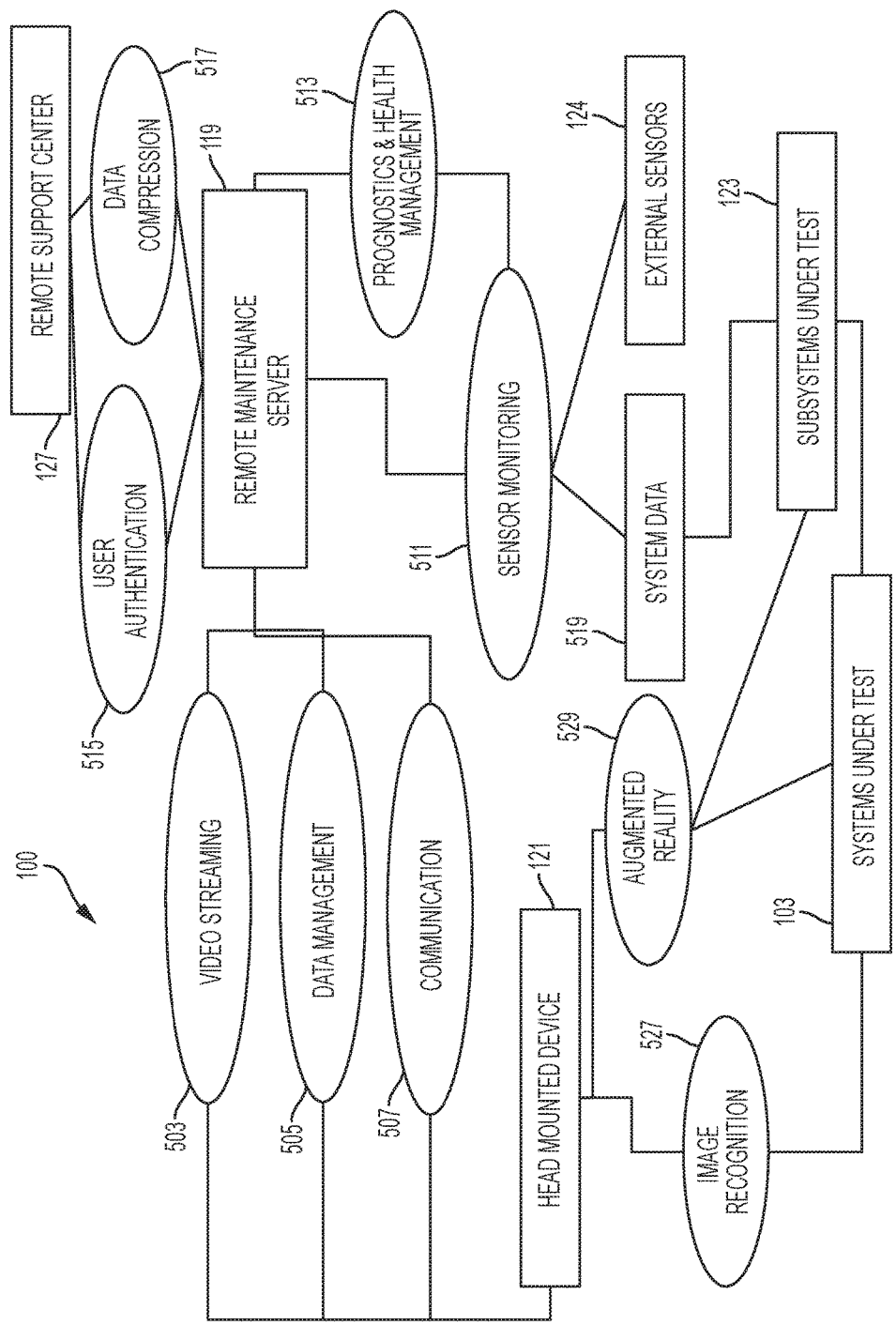
FIG. 10 is an exemplary functional interface diagram of illustrative maintenance assistance system of FIG. 1.

FIG. 10 is a functional interface diagram of an illustrative embodiment of the system 100. The HMD 121 is shown to interface with remote maintenance server 119 to provide a video streaming service 503 to transfer a plurality of visual graphics (not shown) when a user 101 with the HMD 121 looks at a plurality of systems under test 103. The HMD 121 is shown to interface with the remote maintenance server 119 to request a data management service 505 to extract data information from data library 417 in the remote maintenance server 119. The HMD 121 is shown to interface with the remote maintenance server 119 to provide a communication function 507 to exchange voice and video chat from user 107 at a remote support location 127 through the remote maintenance server 119. The HMD 121 is shown to identify a plurality of subsystems under test 123 using an image recognition function 527. The HMD 121 is also shown to project a plurality of three-dimensional models on the plurality of subsystems under test 123 using an augmented reality function 529. The remote maintenance server 119 is shown to interface with a plurality of external sensors 124 and a plurality of system data 519 received from the plurality of subsystem 123 to transmit system information through a sensor monitoring function 511.

The remote maintenance server 119 is also shown to use a prognostics and health management (PHM) function 513 to analyze system information gathered by the sensor monitoring function 511 to generate a set of current system health status and predicted system health information for the plurality of systems under test 103 and the plurality of subsystems under test 123. The remote maintenance server 119 is then shown to provide user authentication service for a plurality of users 107 from the remote support location 127 to connect into the remote maintenance server 119 to transmit and receive data and instruction. The remote maintenance server 119 is also shown to use a data compression function to exchange information in a compressed format with the remote support location 127.

FIG. 10 represents the functions that describe the software, interface standard, and driver used in FIG. 9. The video streaming service 503 shows the video streaming function will be done by the video processing program to allow HMD 121 to view maintenance video and allow the server to stream real-time HMD camera video to remote user. The data management service 505 shows data from the data library 417 to be exchanged between the HMD 121 and the server 119. The communication function 507 is the network connection between the network services at the HMD 121 and server 119. The sensor monitoring function 511 is the sensor data collected by the server 119 through the SNMP service call and other similar data call (some external sensors send data via http/https over a IEEE 802.11/802.15 network). The health management function 513 may include the PHM software as further detailed herein.

The user authentication 515 authenticates the remote user's information. The data compression 517 is configured for the compression and the transfer of maintenance server data to remote support center server 119. The image recognition function 527 and the augmented reality function 529 are illustratively a combined software used to identify and visualize the subsystems 123 inside the system 103.

Figure 11:
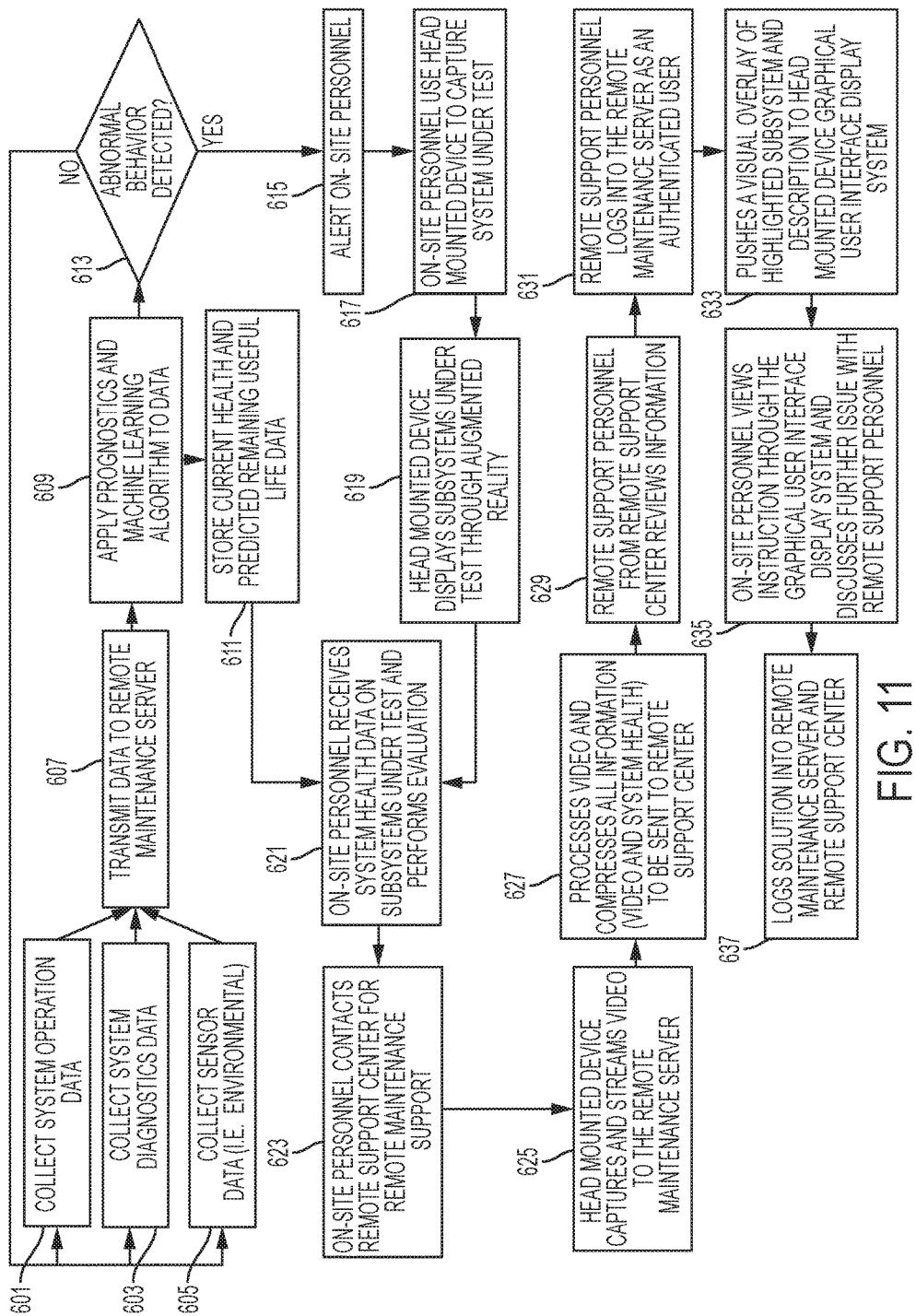
FIG. 11 is a functional flow chart of an exemplary method of operation for secured interactive remote maintenance assist incorporating the illustrative maintenance assistance system of FIG. 1.

FIG. 11 illustrates an exemplary method of operation for secured interactive remote maintenance assist system 100 incorporating an embodiment of the disclosure. Block 601 is shown for system operation data to be collected from a plurality of subsystems under test 123. Block 603 is shown for system embedded diagnostics and fault data to be collected from a plurality of subsystems under test 123. Block 605 is shown for external sensor data to be collected from an exemplary operational environment. Block 607 is shown for a plurality of data to be transmitted and stored at remote maintenance server 119. Block 609 is shown for a remote maintenance server 119 to use a prognostics and health management (PHM) service to apply predictive and/or machine learning mathematic algorithm on a plurality of data. Block 611 is shown for a remote maintenance server 119 to store a current health status and predicted health status data for a plurality of systems under test 103 and a plurality of subsystems under test 123 generated from a prognostics and health management (PHM) service. Block 613 is shown for a remote maintenance server 119 to determine if an abnormal data set or a degrading health status is detected for user 101 at host environment 125 to troubleshoot. Block 615 is shown for a remote maintenance server 119 to send an alert message to user 101 at host environment 125 to troubleshoot the system under test (SUT) 103 with an abnormal data set or a degrading health status.

Block 617 is shown for user 101 at host environment 125 to use head mounted device 121 to capture video and image of a plurality of systems under test 103. Block 619 is shown for head mounted device 121 to project a plurality of three-dimensional model representing a plurality of subsystems under test 123 inside a plurality of systems 103. Block 621 is shown for head mounted device 121 to display a plurality of health status data stored in a remote maintenance server 119 for a plurality of subsystems 123 identified in Block 619. Block 623 is shown for on-site personnel 101 to contact a remote support center 127 to provide remote maintenance assist. Block 625 is shown for head mounted device 121 to capture and stream video to remote maintenance server 119 in a host environment 125 as on-site personnel 101 is looking at a system under test (SUT) 103.

Block 627 is shown for remote maintenance server 119 to process video information and compress both video and system health information to be sent to remote support center 127. Block 629 is shown for remote support personnel 107 to receive information at a remote support center 127 for review. Block 631 is shown for remote support personnel 107 to log into remote maintenance server 119 though an authentication server at a remote maintenance server 119. Block 633 is shown for remote support personnel 107 to push a visual overlay of highlighted subsystem and a plurality of text into a graphical user interface of a head mounted device 121. Block 635 is shown for on-site personnel 107 to view a graphical user interface from head mounted device 121 and discuss with remote support personnel 107 for more information. Block 637 is shown for a plurality of maintenance information to be stored at a remote maintenance server 119 and at remote support center 127 after completion of the maintenance.

Figure 12:
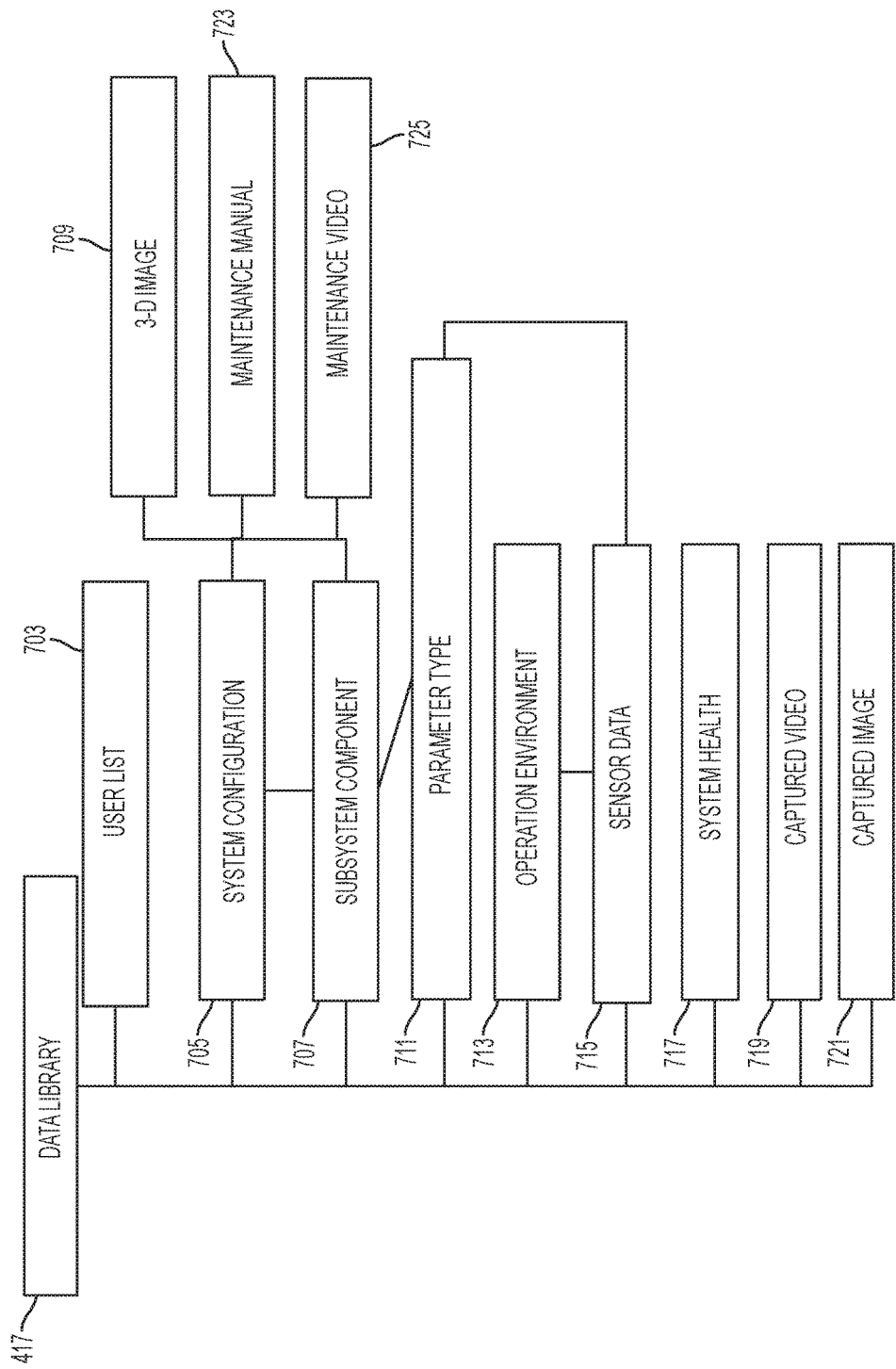
FIG. 12 is a block diagram showing an exemplary list of data residing in a data library within the illustrative processor of FIG. 9.

FIG. 12 illustrates an exemplary list of data residing in data library 417 according to an illustrative embodiment of system 100. The data library 417 is shown to be comprised of a user list 703 for remote access authentication, a system configuration list 705 and a subsystem component configuration list 707 with a plurality of three-dimensional images 709 corresponding to a plurality of systems under test and a plurality of subsystems under test, a parameter type list 711 outlining the type of system data to be monitored, an operational environment list 713 outlining the type of data to be monitored by external sensor, a plurality of sensor data 715 matching a parameter type or an operational environment, a system health status list 717 to be established by a prognostics & health management service within a remote maintenance server, a plurality of captured video 719 and a plurality of captured image 721 from a head mounted device. The system configuration list 705 and the subsystem component configuration list are also shown to include a plurality of maintenance manual 723 and a plurality of maintenance video 725.

The user list 703 is illustratively used to authenticate users for access of the HMD and server. The system configuration list 705 and the subsystem component configuration list 707 are configuration data to show their relationship and individual properties, such as three-dimensional images 709, maintenance manual 723, maintenance video 725, and parameter type list 711. The operational environment list 713 contains environment data that helps construct the environment setting revolving around the system (cold vs hot, dry vs moist, etc.) The sensor data 715 contains the actual data value over time (i.e. 80 degree F.) for each of the parameter or environment setting. The system health status list 717 contains the calculated system health value as computed by the prognostics and health management (PHM) software to show when the system may fail (e.g., remaining useful life has 10,000 hours remaining) and what data drives that conclusion (e.g., power supply voltage values drop an average of 0.1 every 1,000 hours of operational use). The captured video 719 and the captured images 721 are the data captured by the HMD camera 309.

Figure 13:
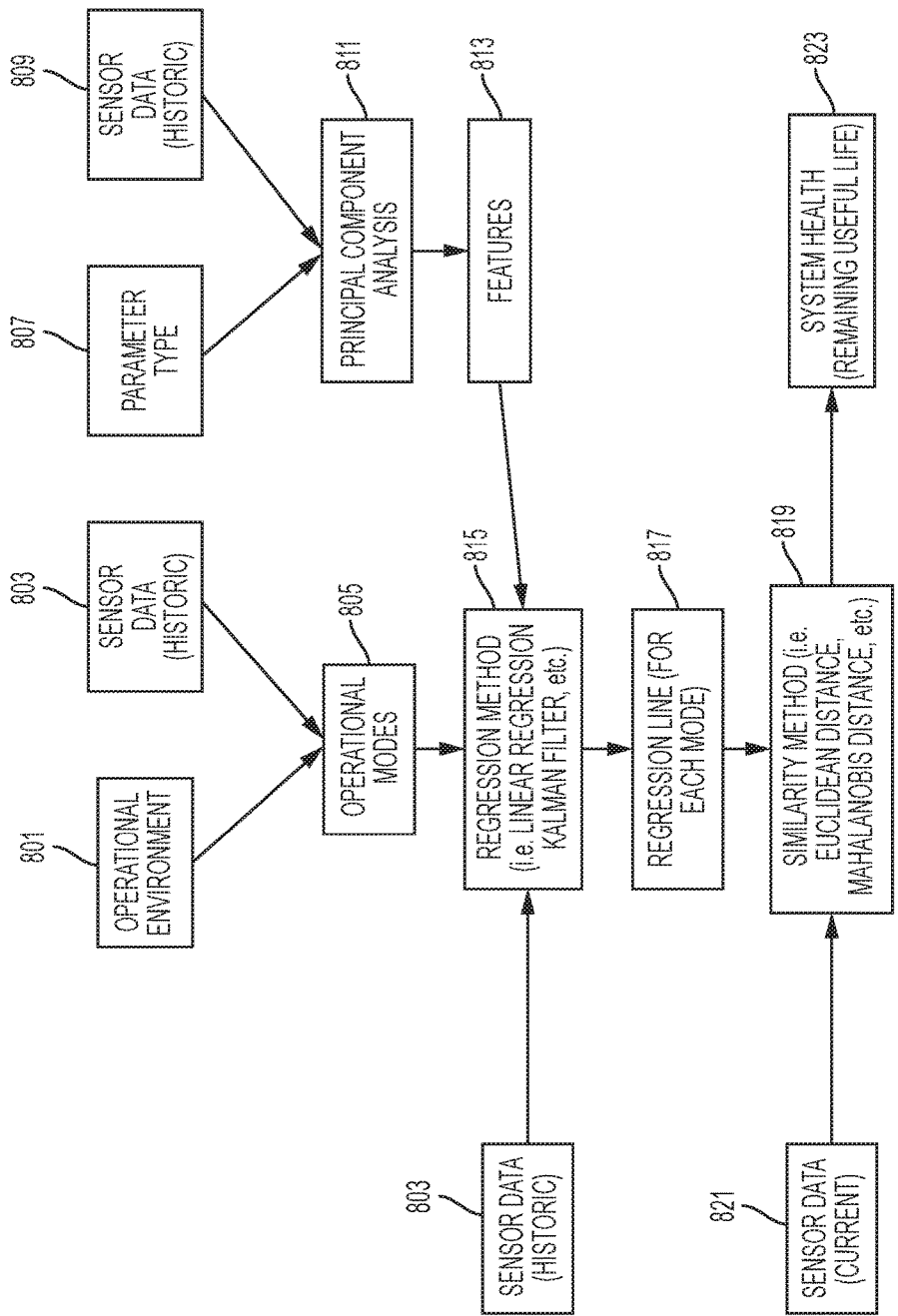
FIG. 13 is a block diagram of an illustrative prognostics and health management (PHM) method of manipulating the library data of FIG. 12.

FIG. 13 illustrates an exemplary data flow of prognostics and health management (PHM) used to retrieve data from the data library 417 to generate system health data in accordance with an illustrative embodiment of the disclosure. As further detailed herein, the PHM method evaluates a plurality of stored sensor parameters for potential failure and suggested action by comprising a statistical recognizer (e.g., algorithm) or a machine learning recognizer (e.g., algorithm). Such recognizers may include, for example: a regression recognizer, a hidden Markov model (HMM), a dynamic time warp (DTW) recognizer, a neural network, a fuzzy logic engine, a Bayesian network or an inference rule engine.

With further reference to FIG. 13, an exemplary plurality of operational environment data 801 and a plurality of historic sensor data 803 are shown to be evaluated to generate a plurality of operational modes 805. A plurality of parameter type data 807, such as temperature and voltage, as well as a plurality of historic sensor data corresponding to the parameter type 809 are shown to be used in a statistical method called principal component analysis to generate a plurality of feature 813 identifying the key parameter types that contribute significantly to failures related to the historic sensor data. The plurality of historic sensor data 803, the plurality of operational modes 805, and the plurality of features 813 are shown to be used in an exemplary regression method 815 such as simple linear regression to generate a plurality of regression line 817 corresponding to the plurality of operational mode 805. A plurality of current sensor data 821 is shown to compare with the plurality of regression line 817 using an exemplary similarity method 819 such as Euclidean Distance or Mahalanobis Distance to establish an exemplary system health value 823 that is used to indicate the expected remaining useful life of the system under test.

Figure 14:
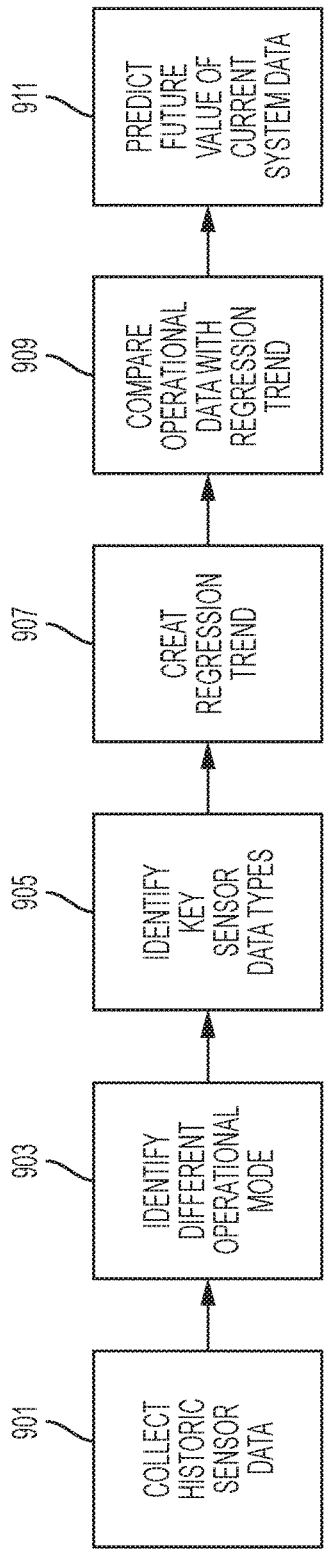
FIG. 14 is a functional flow chart of an exemplary prognostics and health management (PHM) method using a regression analysis.

FIG. 14 illustrates an exemplary regression analysis method of prognostics and health management (PHM) used to generate system health data in accordance with one embodiment of the invention. At block 901, historic data from the system or a similar system is collected. At block 903, different operational modes the system can perform are identified e.g., idle, full capability, etc.). The method continues at block 905 for identifying key sensor data types (i.e., features) that are significant to the failure of the system using a statistical method, such as Principle Component Analysis. At block 907, the historic data is used to create a regression line for each mode using a regression method such as simple linear regression. At block 909, the processor compares current operational data with regression trend where the historic data are operating the same mode. The method continues to block 911, where a similarity method, such as Euclidean Distance or Mahalanobis Distance, is used to measure the similarity between the current data and trend line and predict the future value of the current system data based on where the trend line propagates. Other regression techniques that use physical behavior of the system to create the trend line (i.e. Kalman Filter and Particle Filter) may also be used.

One illustrative form of regression analysis that may be used for prognostics and health management (PHM) is trajectory similarity based prediction (TSBP). Trajectory similarity based prediction (TSBP) is a data-driven approach that computes degradation models from historical data with known failure times. Additional details are provided in Lam, J., Sankararaman, S., and Stewart, B., *Enhanced Trajectory Based Similarity Prediction with Uncertainty Quantification*, Annual Conference of the Prognostics and Health Management Society (2014), the disclosure of which is expressly incorporated herein by reference.

Figure 15:
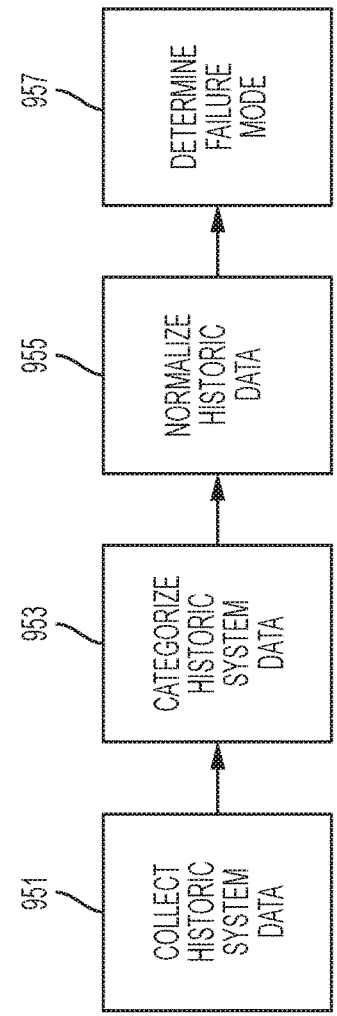
FIG. 15 is functional flow chart of an exemplary prognostics and health management (PHM) method using a machine learning algorithm.

FIG. 15 illustrates an exemplary machine learning method of prognostics and health management (PHM) used to determine the failure mode of a component in accordance with one embodiment of the invention. At block 951, historic failure data from the system or a similar system is collected. At block 953, the processor categorizes the failures in the historic data based on how the sensor data values differentiate from each other, such as a failure related to overheating has an increasing temperature value and a failure related to degraded power supply has decreasing output voltage value. The method continues at block 955 where the system normalizes the historic data with similar sensor values so they converge to a mean for each type of failure using a machine learning method, such as k-mean clustering technique. At block 957, the processor determines the expected failure mode from the current data by comparing how similar is the current sensor value against the mean from each type of the failure. An additional optional step is to measure if the current data is too far from existing data clusters and should be considered as a new type of failure (aka, anomaly detection).

In an alternative embodiment, the remote maintenance server includes a method of prognostics and health management (PHM) used to conduct anomaly detection by using a machine learning classification method such as support vector machine (SVM) to determine if the current sensor value is too far from the failure recorded from the historic data to classify the expected failure mode as a new type of failure.

Although the invention has been described in detail with reference to certain preferred embodiments, variations and modifications exist within the spirit and scope of the invention as described and defined in the following claims.

The invention claimed is:

1. An interactive remote maintenance assist system comprising:
   a head mounted device (HMD) comprising a visual interface, a voice interface system with voice recognition systems, a control section, an imager system operable to collect video or still images, and an input/output system;
   a remote maintenance server (RMS) operable to communicate with said HMD; and
   wherein said control section comprises comprising:
      a first section configured to identify the system under test (SUT) using an image recognition function, wherein said first section collects, using the imager system and the voice interface which a microphone, sound and image data corresponding to sound or image related performance parameters of the SUT and transmitting the sound and image data to the RMS;
      a second section configured to identify a plurality of subsystems (PLoS) within the SUT in a data library;
      a third section configured to create three dimensional models of the PLoS and displaying the same on the visual interface of the HMD using an augmented reality function;
      a fourth section configured for collecting SUT data or sensor data comprising one or more of temperature, fan speed, processor speed, memory capacity, and voltage power values corresponding to performance parameters of the SUT, wherein the fourth section further is configured for connecting to the RMS using an encrypted connection wherein connecting is via streaming video or images sent to the RMS, wherein said connecting further comprises sending said SUT data and said sensor data from one or more sensors collecting said sensor data from the SUT;

a fifth section configured for conducting a prognostics and health management (PHM) service on the collected data to determine system health and projected health of the SUT or PLoS, wherein said system health and projected health of the SUT or PLoS is determined at least in part using machine instructions or control logic which execute principle component analysis logic comprising:

generating a regression trend determination based on a linear regression method, wherein the regression trend includes a performance trend line indicating prospective performance of the SUT;

comparing at least the SUT data corresponding to the performance parameters of the SUT to the performance trend line of the regression trend;

predicting prospective values of the SUT data or the sensor data;

displaying on the visual interface a visual graphic depicting a model of the SUT and at least some of the SUT data or sensor data associated with elements of the SUT;

determining in cooperation with the RMS a root-cause for at least one of a current system failure associated with the SUT or a prospective system failure associated with SUT; and a sixth section configured to authenticate remote user access to the RMS, update the data library, and insert a plurality of (PHM) designators on the visual interface.

2. A method in an interactive remote maintenance assist system, the method comprising:

providing a system under test including a plurality of systems and subsystems, the system under test or said subsystems including one or more system racks having a plurality of computing servers disposed therein, the computing servers having a plurality of circuit boards including at least one sensor that provides sensor data indicating one of temperature, fan speed, processor speed, memory capacity, and voltage power values, the sensor data corresponding to performance parameters of said system under test that includes at least one computing server;

providing a first display device comprising a camera, a microphone, a transceiver, a power unit, the first display device is oriented to display the first display device within a first user's field of view, wherein said first display device is positioned at a first location, the first display device including display that generates a first graphical user interface (GUI);

providing a second display device positioned at a second location that is spaced apart from the first location, the second display device being communicably coupled to the first display device and including a second (GUI);

providing a network device and a maintenance server, the maintenance server communicably coupled to the first display device and the second display device using the network device;

collecting, by the camera and microphone in the first display device, sound and image data corresponding to performance parameters of the at least one computing server and transmitting the sound and image data to the maintenance server, said maintenance server selectively communicating the sound and image data to the second display device by way of the maintenance server;

identifying, by the first display device, one or more sensor data types corresponding to a cause of a current system failure or a prospective system failure, wherein identifying the one or more sensor data types includes utilizing principle component analysis logic comprising:

creating, by one of the first display device and the maintenance server, a regression trend determination based on a linear regression method, wherein the regression trend includes a performance trend line indicating prospective performance of the system under test;

comparing, by one of the first display device and the maintenance server, the collected performance parameters to the performance trend line of the regression trend;

predicting, by one of the first display device and the maintenance server, prospective values of the at least one sensor, the prospective values including said sensor data indicating one of temperature, fan speed, processor speed, memory capacity, and voltage power values, the sensor data corresponding to prospective performance parameters of the at least one computing server;

displaying, by the first and second display devices, a visual graphic depicting a model of the system under test, the model including digital relational structures corresponding to the computing servers and wherein the sensor data provided by the sensors is viewable within the model and accessible by at least the second display device;

determining, by one of the first display device and the maintenance server, a root-cause for one of the current system failure and the prospective system failure associated with the at least one computing server and wherein the maintenance server enables a second user at the second location to transmit, to the first display device, instructions for resolving the current system failure and for mitigating occurrence of the prospective system failure, the instructions being displayed by way of the first GUI.

3. The method of claim 2, the first and second displays each include object recognition logic such that the model of the system under test depicted by the first and second GUIs each include digital relational structures corresponding to the computing servers and wherein the sensor data provided by the sensors is viewable within the model and accessible by at least the second display device.

4. The method of claim 2, further including, logging, by a user at the first location, the instructions and corresponding solution that resolves the current system failure, wherein a log including the instructions and corresponding solution is stored within a memory of the maintenance server.

5. The method of claim 2, further including, identifying one or more operational modes of the interactive remote maintenance system, the operational modes including one of an idle mode and a full capability mode.

6. The method of claim 2, further including, capturing, by the first display device, video data and audio data, and streaming the video and audio data to the maintenance server and from the maintenance server to the second display device, the video being viewable by way of the second GUI.

7. The method of claim 2, wherein predicting prospective values of the at least one sensor includes utilizing similarity logic to measure similarities between the collected performance parameters and the performance trend line of the regression trend, wherein the similarity logic is based on at least one of a Euclidean Distance method and a Mahalanobis Distance method.

\* \* \* \* \*